United States Patent
Muhle et al.

(10) Patent No.: US 8,383,739 B2
(45) Date of Patent: Feb. 26, 2013

(54) SYSTEMS AND METHODS FOR MONITORING A POLYMERIZATION REACTION

(75) Inventors: Michael E. Muhle, Kingwood, TX (US); Richard B. Pannell, Kingwood, TX (US); Eric J. Markel, Kingwood, TX (US); Robert O. Hagerty, Wyckoff, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/265,061

(22) PCT Filed: May 5, 2010

(86) PCT No.: PCT/US2010/033659
§ 371 (c)(1),
(2), (4) Date: Oct. 18, 2011

(87) PCT Pub. No.: WO2010/129634
PCT Pub. Date: Nov. 11, 2010

(65) Prior Publication Data
US 2012/0041159 A1    Feb. 16, 2012

Related U.S. Application Data

(60) Provisional application No. 61/176,661, filed on May 8, 2009, provisional application No. 61/265,873, filed on Dec. 2, 2009.

(51) Int. Cl.
C08F 2/00    (2006.01)
C08F 2/38    (2006.01)
C08F 4/00    (2006.01)
C08F 210/00  (2006.01)

(52) U.S. Cl. ............... 526/60; 526/66; 526/74; 526/89; 526/348

(58) Field of Classification Search .............. 526/60, 526/68, 74, 89, 348
See application file for complete search history.

(56) References Cited

U.S. PATENT DOCUMENTS

| | | | |
|---|---|---|---|
| 4,543,399 | A | 9/1985 | Jenkins, III et al. |
| 4,588,790 | A | 5/1986 | Jenkins, III et al. |
| 5,352,749 | A | 10/1994 | DeChellis et al. |
| 5,405,922 | A | 4/1995 | DeChellis et al. |
| 5,436,304 | A | 7/1995 | Griffin et al. |

(Continued)

FOREIGN PATENT DOCUMENTS

| | | |
|---|---|---|
| WO | WO 03/051929 | 6/2003 |
| WO | WO 2005/113615 A2 | 12/2005 |

(Continued)

OTHER PUBLICATIONS

Process Analysis & Automation Limited (PAA), "Acoustic Emission Technology—A New Sensing Technique for Optimising Polyolefin Production" (© 2000).

(Continued)

*Primary Examiner* — William Cheung
(74) *Attorney, Agent, or Firm* — Kristina Leavitt; Jennifer A. Schmidt

(57) ABSTRACT

Systems and methods for monitoring a polymerization reactor are provided. The method can include estimating an acoustic condition of a polymer produced in a reactor. The method can also include estimating a stickiness control parameter of the polymer produced in the reactor. The method can further include pairing the acoustic condition with the stickiness control parameter to provide a paired acoustic condition and stickiness control parameter.

23 Claims, 4 Drawing Sheets

U.S. PATENT DOCUMENTS

| | | |
|---|---|---|
| 7,122,607 B2 | 10/2006 | Hagerty et al. |
| 7,774,178 B2 | 8/2010 | Pannell et al. |
| 7,910,668 B2 | 3/2011 | Muhle et al. |
| 2007/0060721 A1 | 3/2007 | Muhle et al. |
| 2008/0065360 A1* | 3/2008 | Pannell et al. ............ 703/2 |
| 2008/0319583 A1 | 12/2008 | Hagerty et al. |
| 2010/0144983 A1 | 6/2010 | Markel et al. |

FOREIGN PATENT DOCUMENTS

| | | |
|---|---|---|
| WO | WO 2009/014682 | 1/2009 |

OTHER PUBLICATIONS

Process Analysis & Automation Limited (PAA), "Agglomeration Detection by Acoustic Emission," PAA Application note: 2002/111 (© 2000).

* cited by examiner

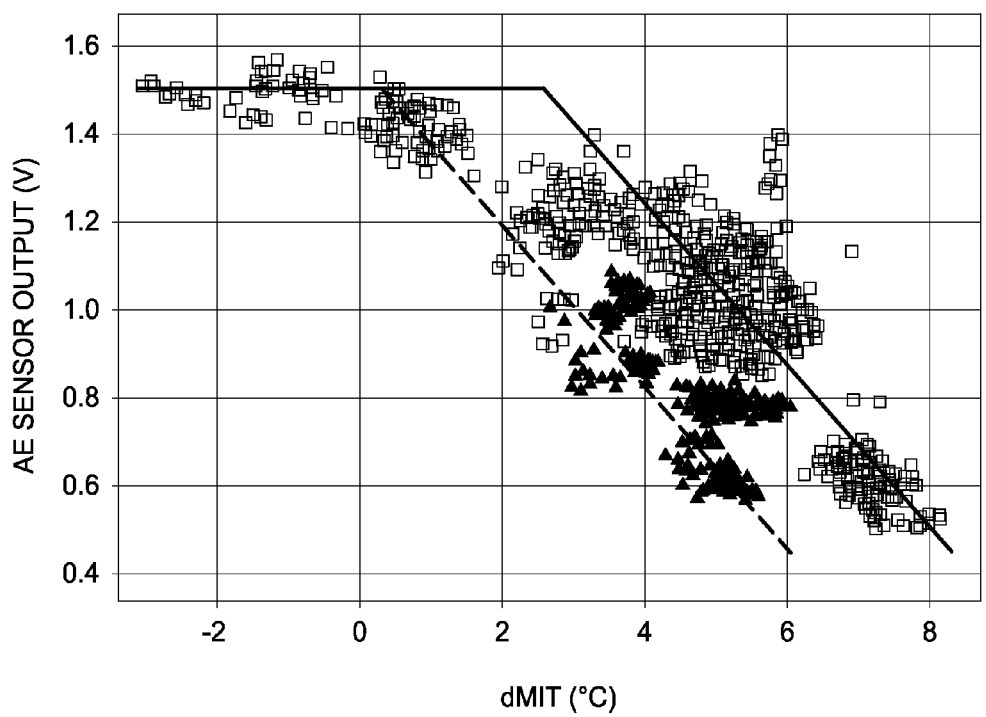
FIG. 1
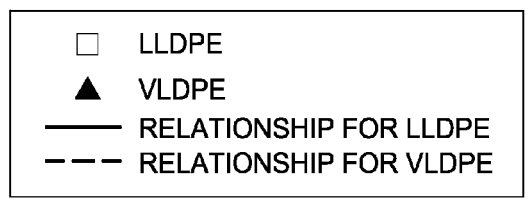

… … …

SYSTEMS AND METHODS FOR MONITORING A POLYMERIZATION REACTION

CROSS-REFERENCE TO RELATED APPLICATIONS

This application is a National Stage application under 35 U.S.C. §371 of International Application No. PCT/US2010/36659, filed May 5, 2010, that claims the benefit of Ser. Nos. 61/176,661 filed May 8, 2009 and 61/265,873 filed Dec. 2, 2009, the disclosures of which are incorporated by reference in their entireties.

FIELD OF THE INVENTION

Disclosed herein are systems and methods for monitoring polymerization reactions. More particularly, this disclosure relates to systems and methods for monitoring polyolefin polymerization reactions to more reliably determine the degree of polymer stickiness in a reactor.

BACKGROUND OF THE INVENTION

Gas phase polymerization converts a gaseous monomer into granular solids. The gaseous monomer, and optional comonomer(s), are introduced under pressure into a reaction vessel, i.e. reactor, containing a catalyst and optional activator. Once polymerization begins, the monomer molecules diffuse to the growing polymer chains within the reactor. The resulting polymer can be obtained as a granular solid which can be fluidized within the reactor, along with the monomer and catalyst. Polymerization can include the use of induced condensing agents ("ICAs") in order to increase the production rate of the polymer. However, the presence of ICAs in a polymerization reaction reduces the temperature at which the polymer begins to become "sticky." Polymer stickiness causes polymer particles within a polymerization reactor to begin to stick together, which can lead to polymer buildup within the reactor, which in turn causes process upsets, e.g. reactor shutdown. The buildup of polymer is usually referred to as agglomeration, chunking, or sheeting of the polymer within the reactor.

Monitoring various reactor parameters can provide an indication or warning as to the potential for or the presence of polymer stickiness within the polymerization reactor. Typical methods or systems used for monitoring the degree of polymer stickiness include monitoring acoustic conditions with acoustic sensors and monitoring a stickiness control parameter of the polymer being produced within the reactor. Monitoring acoustic conditions requires producing a series of polymers under "dry" conditions, i.e. without ICAs, in order to generate calibration curves for the acoustic sensors, which is time consuming and must be repeated from time to time in order to check for acoustic sensor drift. Furthermore, acoustic condition sensors require frequent calibration in order to assure that accurate acoustic conditions are being acquired. Monitoring the stickiness control parameter is prone to inaccuracies as well, which are caused by one or more inaccurate measurements such as reactor temperature, reactor composition, and polymer properties, e.g. melt index and density.

There is a need, therefore, for improved systems and methods for monitoring a polymerization reaction to determine the degree of polymer stickiness.

SUMMARY OF THE INVENTION

Systems and methods for monitoring a polymerization reactor are provided. The method can include estimating an acoustic condition of a polymer produced in a reactor. The method can also include estimating a stickiness control parameter of the polymer produced in the reactor. The method can further include pairing the acoustic condition with the stickiness control parameter to provide a paired acoustic condition and stickiness control parameter.

In at least one embodiment, the method for monitoring a polymerization reactor can include estimating a plurality of acoustic conditions for a plurality of polymers while the plurality of polymers is produced in a reactor over a period of time. The method can include estimating a plurality of stickiness control parameters for the plurality of polymers. The method can further include pairing the plurality of acoustic conditions with the plurality of stickiness control parameters to produce a plurality of paired acoustic conditions and stickiness control parameters. The method can also include determining a relationship between the plurality of paired acoustic conditions and stickiness control parameters.

In at least one embodiment, the method for monitoring a polymerization reaction can include estimating an acoustic condition for a polymer being produced in a polymerization reactor. The method can also include identifying an expected current stickiness control parameter of the polymer from the estimated acoustic condition and a predetermined relationship. The predetermined relationship can be produced from a plurality of previously determined acoustic conditions paired with a plurality corresponding and previously determined stickiness control parameters.

BRIEF DESCRIPTION OF THE DRAWINGS

FIG. 1 depicts a plot of data values; each data value represents an acoustic condition paired or related with a corresponding stickiness control parameter for two different classes of polymers produced in a reactor. The solid and dashed lines depicted in FIG. 1 represent a relationship, for each polymer class, between the paired acoustic conditions and stickiness control parameter values.

DETAILED DESCRIPTION

Figure 2:
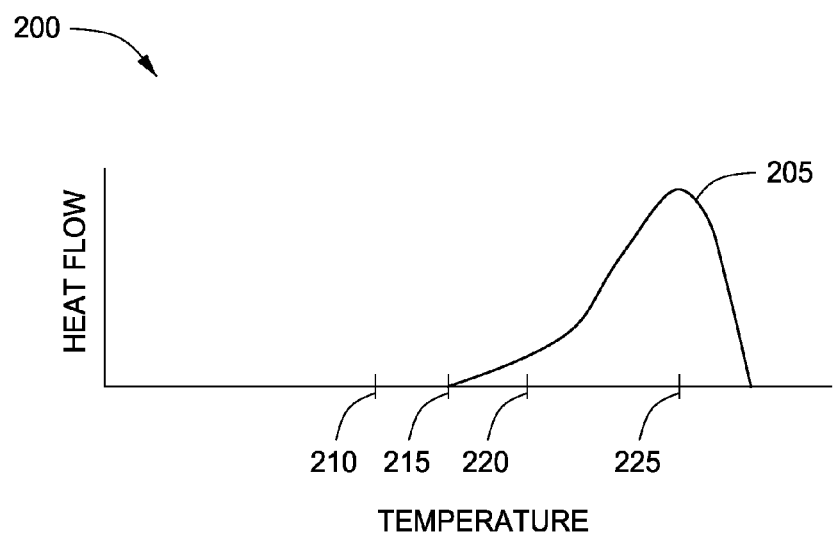
FIG. 2 depicts a general representation of a typical Differential Scanning calorimeter ("DSC") melting curve for polymers.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

To monitor a polymerization reaction according to one or more embodiments provided herein, at least one acoustic condition and at least one stickiness control parameter of a polymer produced in a polymerization reactor are estimated. The acoustic condition can be any acoustic or audible signal generated from a reaction medium within the reactor. As used herein, the term "reaction medium" refers to a fluidized bed of growing polymer particles, formed polymer particles, and catalyst particles fluidized by the flow of polymerizable and modifying gaseous and/or liquid components.

The stickiness control parameter can correspond, for example, to a sticking temperature; the imminence of polymer stickiness in the reactor; a degree of stickiness in the reactor; or any combination or derivative thereof. The stickiness control parameter can be used to forewarn or indicate the possibility of sheeting or agglomeration within the reactor. As used herein, the term "polymer stickiness" refers to an increase or decrease in tackiness or cohesiveness of the polymer particles being produced in the reactor. The tackiness or cohesiveness of the polymer particles being produced in the reactor can increase or decrease due to any number of factors, which can include, for example, temperature, pressure, the presence and amount of induced condensing agent(s) ("ICAs"), comonomers, and/or isomonomers of the comonomers within the reactor. As used herein, the term "degree of polymer stickiness" refers to a degree or level of polymer stickiness within the reactor. When polymer stickiness sufficiently increases, fundamental changes in fluidization within the reactor can occur. Polymer stickiness can cause the agglomeration or chunking of polymer particles and/or accumulation or sheeting of polymer on the walls of the reactor, which can eventually result in a discontinuity event. As used herein, the term "discontinuity event" refers to a disruption in the operation of the polymerization reaction caused by sheeting, chunking, agglomerating, fouling, or any similar situation, any of which can ultimately lead to reactor shutdown. The terms, "sheeting," "chunking," "agglomerating," "fouling," and the like refer to different manifestations of problems caused by excessive polymer stickiness in the reactor.

As used herein, the term "stickiness control parameter" refers to a calculated parameter equal to a current reactor temperature ("$T_{RX}$") minus a depressed or reduced melt reference temperature ("$MRT_R$") of the polymer within the reactor, defined herein as dMRT. As such, the dMRT can be determined from the equation $dMRT = T_{RX} - MRT_R$. The depression or reduction in melt reference temperature of a particular polymer can be due, at least in part, to the presence of one or more diluents in the reactor. In one or more embodiments, a melt reference temperature depression model and a dry melt reference temperature ("dry MRT") can be used to determine or estimate, from at least one monitored reaction parameter of the polymerization reaction, the reduced melt reference temperature for the polymer within the reactor while in the presence of one or more diluents. Illustrative reaction parameters that can be monitored can include, but are not limited to, the catalyst(s) and the amount of catalyst(s) within the reactor, the temperature and/or pressure within the reactor, the concentration of ICAs, comonomers, isomonomers of the comonomers, and/or hydrogen, and/or polymer properties such as density and melt index of the polymer produced in the reactor. The temperature within the reactor can also be monitored and the estimated reduced melt reference temperature ($MRT_R$) can be subtracted therefrom to provide the estimated stickiness control parameter, dMRT. Accordingly, the physical unit of the stickiness control parameter dMRT is degrees Celsius.

Monitoring the polymerization reaction can further include pairing or relating the estimated acoustic condition and the estimated stickiness control parameter to provide a paired acoustic condition and stickiness control parameter. In one or more embodiments, a plurality of acoustic conditions and a plurality of stickiness control parameters can be estimated and paired together to provide a plurality of paired acoustic conditions and stickiness control parameters. In one or more embodiments, a plurality of paired or related acoustic conditions and stickiness control parameters for a series of various polymers can be used to produce a relationship between the plurality of paired acoustic conditions and stickiness control parameters. The relationship between the plurality of paired acoustic conditions and stickiness control parameters can be referred to as a "predetermined relationship." The plurality of paired acoustic conditions and stickiness control parameters can be estimated or determined for polymers in different classes, the same class, or both. As such, a predetermined relationship for very low density polymers, low density polymers, medium density polymers, high density polymers, or any combination thereof can be produced.

In one or more embodiments, the predetermined relationship can be used in conjunction with a current acoustic condition to estimate or determine an expected current stickiness control parameter. In one or more embodiments, the predetermined relationship can be used in conjunction with a current stickiness control parameter to estimate or determine an expected current acoustic condition.

Referring again to the acoustic condition, the acoustic condition can be detected using any acoustic sensor known in the art. A suitable acoustic sensor can be, for example, a microphone or other acoustic receiving device that can detect sound waves, including high frequency (ultrasonic) sound waves. The acoustic sensor can also amplify the detected sound waves. A suitable acoustic condition sensor can include a piezoelectric transducer that can detect an acoustic signal generated by the impact and/or accumulation of a reaction zone product, e.g., polymer particles, on the interior of the reactor walls, for example. In one or more embodiments, the acoustic condition sensor can be a narrow bandwidth piezoelectric sensor with local pre-amplifiers that produce a gain of about 40 decibels (dB), where 0 dB equals a 1 microvolt output from the sensor. The pre-amplifier output can be further amplified using one or more signal amplifiers with a range of from about 0 dB to about 48 dB, which can produce a measurable signal ranging from about 0.1 volt to about 10 volts. The signals can be narrow band filtered around a center frequency of about 190 kHz using a 100-350 kHz band pass filter, for example. The desired audible signals include the frequency of the process rather than the frequency of the sensor. The audible signal can be conditioned to produce an output proportional to lower frequency variations in the range of the narrow-band acoustic condition signal, typically in the audible range of from about 0 kHz to about 20 kHz. A root mean square filter, for example, can be used to condition the audible signals. Once the voltage output of the acoustic sensor is measured, the output can be paired with a corresponding stickiness control parameter value, as discussed in more detail below. In one or more embodiments, the acoustic condition of a polymer produced in a reactor can be estimated using one or more acoustic condition sensors which can provide real-time or on-line acoustic data indicative of the acoustic condition of the polymer being produced within the reactor. As used herein, the terms "real-time" and "on-line" are used interchangeably and refer to data or information acquired from the reactor during the polymerization reaction. Monitoring the polymerization reaction by estimating the acoustic condition of the polymer produced within the reactor is discussed and described in U.S. Publication No. 2007/0060721.

Referring again to the estimation of the stickiness control parameter, the dry MRT is a distinct and measurable temperature that is characteristic of the melting behavior for a dry version, i.e. in the absence of ICAs, comonomers, isomonomers, and the like, of a given polymer and can be determined or estimated using any characteristic melting behavior. The dry MRT is the maximum temperature at which a particular polymer being produced in the reactor will not become sticky in the absence or substantial absence of ICAs and/or comonomers, which as discussed above, reduce the melting point of the polymer. As used herein, the term "substantial absence of ICAs and/or comonomers," refers to the production of a polymer that does not include the deliberate addition of ICAs and comonomers. The dry MRT can be determined for one or more polymers that are produced or expected to be produced within the reactor in the absence or at least substantial absence of ICAs, comonomers, and/or isomonomers, i.e. a dry version of the polymer undergoing the polymerization reaction. Preferably, a dry MRT for a range of potential polymers can be determined and input into a table, database, or the like for later reference. For example, the dry MRTs can be input into an electronic database that can be accessed by a processor.

Estimation of the stickiness control parameter can include one or more process variables that can affect the degree of polymer stickiness. Illustrative process variables can include, but are not limited to, polymer density and melt index, reactor temperature ($T_{RX}$), reactor pressure, and the concentrations and types of diluents present within the reactor. The stickiness control parameter provides a single variable that can be monitored during the polymerization reaction and can be used as one indicator of when operational parameters of the reactor should be altered or adjusted in order to prevent or reduce the potential of a discontinuity event.

The reduced melt reference temperature ($MRT_R$) can be estimated or determined using any known melt reference temperature depression model. Illustrative methods for estimating the $MRT_R$ can include, but are not limited to, the Flory equation, the Sanchez-Lacombe equation of state ("SL EOS"), the Statistical Association Fluid Theory Equation of State ("SAFT EOS"), and empirical methods/models. Illustrative estimation of the $MRT_R$ using the Flory equation is discussed and described in U.S. Patent Publication No. 2008/0065360 (the "MIT application") and PCT Publication No. WO2008/030313 (the "MRT application"), which are incorporated by reference herein. The term "melt reference temperature depression model" is used herein in the same broad sense in which it is used in the MRT application, and the expression "melt initiation temperature depression model" is used herein in the same sense in which it is used in the MIT application. Each melt initiation temperature depression model is a member of the broader class of "melt reference temperature depression models," so that the set of all melt initiation temperature depression models is a subset of the set of all melt reference temperature depression models.

The temperature at which a polymer being produced within the reactor becomes excessively sticky and creates the potential for a discontinuity event can be referred to as the "limiting stickiness control parameter" or "dMRT limit" or "limiting value of dMRT." Attempting to operate the reactor at or above the limiting value of dMRT can result in excessively sticky polymer and can create the potential for a discontinuity event. The probability of a discontinuity event can be reduced or prevented as long as the dMRT value remains less than the limiting value of dMRT. Depending on the particular catalyst(s) used and the type of polymer produced in the reactor, the limiting value of dMRT will vary. For example, the limiting value of dMRT can range from a low of about 1° C., about 2° C., about 3° C., about 4° C., or about 5° C. to a high of about 6° C., about 7° C., about 8° C., about 9° C., or about 10° C. Typically the limiting value of dMRT varies between about 5.5° and 8.5° C. In one or more embodiments, the exact limiting value of dMRT for a particular catalyst system and polymer can be estimated during production of each particular polymer or in a laboratory. In one or more embodiments, commercially available data can be used to determine the limiting value of dMRT for a particular catalyst system and polymer.

Suitable melting behaviors of polymers that can be used as the dry melt reference temperature include, but are not limited to, a melting peak temperature as determined by differential scanning calorimetry ("DSC") on a dry polymer sample; a polymer seal initiation temperature measured on a polymer film sample; a polymer hot tack initiation temperature; a dry sticking temperature of granular polymer in a fluid bed; a dry melt initiation temperature (MIT) determined by the onset of rapid melting as determined by DSC on a dry polymer sample; and/or a temperature at which the polymer can be expected to melt or begin to melt in the reactor while the reactor is operating at normal pressure and gas velocity, but in the presence of an inert gas, such as nitrogen, rather than ICAs, comonomers, and/or isomonomers. Suitable melting behaviors of polymers that can be used as the dry melt reference temperature are discussed and described in U.S. Pat. No. 7,122,607.

The stickiness control parameter can be determined in real-time or it can be determined at a later point in time. Accordingly, the acoustic condition and the stickiness control parameter for a particular polymer being produced within the reactor can be paired or related with one another either in real-time or later in time. For example, an acoustic condition and a corresponding stickiness control parameter, both estimated in real-time, can be paired with one another to provide a data point, which can be plotted on a graph, such that the acoustic condition is on a first axis and the stickiness control parameter is on a second axis. In another example, an acoustic condition estimated in real time can be noted and recorded and a stickiness control parameter for a polymer produced within the reactor during or close to the acquisition time of the acoustic condition can be determined or estimated at a later point in time, e.g. by tests performed on the polymer sample in a lab. The stickiness control parameter can then be paired or related to the recorded acoustic condition earlier determined or estimated.

In one or more embodiments, a polymer sample for which a stickiness control parameter can be determined or estimated at an earlier or later point in time can be produced in the reactor at a time substantially close to the time the corresponding acoustic condition is acquired. Depending upon the particular polymerization reaction and reactor, a stickiness control parameter, estimated at a different point in time from when the acoustic condition is acquired, can be estimated from a sample produced in the reactor within about +/−6 hours, about +/−5 hours, about +/−4 hours, about +/−3 hours, about +/−2 hours, or about +/−1 hour of the time at which the acoustic condition is estimated. For example, a polymer sample for which a stickiness control parameter can be determined or estimated at a later point in time can be produced within the reactor within about +/−30 minutes, +/−20 minutes, +/−15 minutes, +/−10 minutes, +/−8 minutes, +/−5 minutes, +/−3 minutes, +/−2 minutes, +/−1 minute, or +/−0.5 minutes of the time at which the acoustic condition is estimated. As such, real-time pairing or delayed/later pairing of one or more acoustic conditions and corresponding stickiness control parameters can be performed.

Individual or different grades of polymer products produced in the reactor under condensed mode conditions, i.e. in the presence of one or more diluents, are subject to different operating conditions due to the ability to tolerate different levels of diluents, temperature, and other process conditions. Therefore, different grades of polymer products have different limiting stickiness thresholds or points. Monitoring both the acoustic condition and the stickiness control parameter and pairing or relating the corresponding values together can provide an indication as to the degree of polymer stickiness within the reactor for a variety of different polymers via the relationship (also referred to as the predetermined relationship) determined or produced from the plurality of paired acoustic conditions and stickiness control parameters.

The plotted data shown in FIG. 1 represents data generated by monitoring polymerization reactions over a period of approximately two months. As can be seen from the plotted data, during the approximate two month time period, a wide range of polymer products were produced. The wide range of polymer products included, among others, variations in densities, melt indices, and production rates. The data points shown as open or hollow squares correspond to paired acoustic conditions and stickiness control parameters for distinct and different grades of linear low density polyethylene products ("LLDPE"). The data points shown as a solid triangle correspond to paired acoustic conditions and stickiness control parameters for distinct and different grades of very low density polyethylene products ("VLDPE"). As used herein, "linear low density polyethylene" and "LLDPE" refers to polymers having a density greater than about 0.9165 g/cm$^3$. As used herein, "very low density polyethylene" and "VLDPE" refer to polymers having a density less than about 0.9165 g/cm$^3$.

In order to generate the plotted data shown in FIG. 1, one temperature sensor was placed in communication with a polymerization reaction zone or bed, such that the temperature sensor extended about 15.3 cm (6 in) into the reaction zone. An acoustic condition sensor was disposed on a reactor wall adjacent the temperature sensor. A gas chromatograph in fluid communication with the reactor above the reaction zone was used to acquire process information, such as gas composition within the reactor. Each polymerization reaction took place in a reactor that had a cylindrical section having a height of 14.5 m (47.5 ft) and a diameter of 4.42 m (14.5 ft). The temperature sensor and the acoustic condition sensor were mounted at an elevation of about 6.4 m (21 ft) above a distributor plate disposed at the bottom of the cylindrical section.

The position of each plotted data value along the horizontal or x-axis indicates the stickiness control parameter for the polymer product, and once plotted, can be referred to as a "reference stickiness control parameter." The position of each plotted data value along the vertical or y-axis indicates the acoustic condition sensor output, also referred to as the acoustic condition, and once plotted, can be referred to as a "reference acoustic condition."

The acoustic conditions were taken as the voltage output from the acoustic condition sensor, which indicates the corresponding acoustic energy within the reactor for the particular polymer at the time the acoustic condition output is determined, estimated, or otherwise acquired. As can be seen from the plotted data in FIG. 1, the stickiness control parameter decreases as the acoustic condition increases. Likewise, the stickiness control parameter increases as the acoustic condition decreases.

In order to estimate the stickiness control parameters, reduced melt initiation temperatures ($MIT_R$) were used. However, any characteristic specific to the polymer being produced within the reactor that indicates when the polymer begins to become sticky can be used. For example, a melting peak temperature can be used to estimate the stickiness control parameter. An estimated stickiness control parameter that uses the $MIT_R$ can be represented or expressed as "dMIT." The stickiness control parameter (dMIT) can be equal to the temperature of the reactor ($T_{RX}$) minus the $MIT_R$ or ($dMIT=T_{RX}-MIT_R$). Each $MIT_R$ was generated using a melt initiation temperature depression model from a measured reaction parameter set indicative of the reaction and a dry melt initiation temperature for the polymer product. In particular, the Flory melt depression equation was used to estimate the $MIT_R$. The stickiness control parameter was estimated as a function of the reaction zone temperature and the concentration of ICA(s), comonomer(s), and isomonomers(s) of the comonomer(s) within the reactor. The estimation of the stickiness control parameter can use measured values of condensable gas concentrations in the reactor (ICAs, comonomers, isomonomers, and any other condensable inerts in the reactor) and expressions for solubilities of hydrocarbons in the polymer being produced to estimate an expected depression (or reduction) in the melt initiation temperature (MIT).

After a sufficient number of paired data points, i.e. paired acoustic conditions and stickiness control parameters, have been acquired and plotted, a relationship can be determined from the data plotted in FIG. 1 in any of a variety of ways. For example, a curve (e.g., a line or polynomial of higher degree) can be fitted to the correlated paired acoustic conditions and stickiness control parameters. The fitted curve shows the functional relationship between the acoustic conditions and the stickiness control parameters, and the functional relationship can be the relationship or predetermined relationship.

In one or more embodiments, the acoustic conditions and the stickiness control parameters can be input into a processor and the paired acoustic conditions and stickiness control parameters and the relationship therebetween can be determined via the processor. As shown in FIG. 1, a first curve, shown by a solid line, is fitted to the paired acoustic condition and stickiness control parameter data points for the LLDPEs. The first curve is one representation of the relationship between the paired acoustic conditions and stickiness control parameters for the LLDPE polymers. Similarly, a second curve, shown by a dashed line, is fitted to the paired acoustic conditions and stickiness control parameters for the VLDPEs. The second curve is one representation of the relationship between the paired acoustic conditions and stickiness control parameters for the VLDPE polymers.

The first relationship for the LLDPEs is offset from the second relationship for the VLDPEs. The first relationship is also generally parallel to the second relationship. Not wishing to be bound by theory, this effect is believed to be caused by the slow crystallization kinetics of VLDPE grades relative to the faster crystallization kinetics of other polyethylene grades, such as the LLDPE grades. The relationship for the VLDPEs shows that the stickiness control parameter (dMIT) "alarm point," or the value of dMIT at which corrective action should be taken in order to prevent or reduce the possibility of a discontinuity event, is about 2.5° C. lower than the dMIT alarm point for the LLDPEs. The stickiness control parameter alarm point for the various polymers typically ranges from about 4° C. to about 10° C. Should the temperature of the reactor exceed the alarm point, polymer stickiness can begin to occur within the reactor, which can lead to a discontinuity event.

Once a relationship between the paired acoustic conditions and stickiness control parameters has been determined, either the acoustic condition or the stickiness control parameter can be estimated and then an expected value of the non-determined value, i.e. the non-determined acoustic condition or the non-determined stickiness control parameter, can be estimated. For example, if the acoustic condition has an output value of 1.2 volts, as shown on the vertical axis of FIG. 1, an estimated stickiness control parameter can be determined from the relationships. From FIG. 1, the dMIT that corresponds to an acoustic condition of 1.2 volts would be about 2° C. for a VLDPE and about 4.3° C. for a LLDPE polymer being produced in the reactor. Alternatively, an appropriately programmed processor can be used to determine or estimate a corresponding current value of the stickiness control parameter in the reactor for the acoustic condition sensor output value of 1.2 volts. The relationships can be introduced to the processor and/or can be introduced and stored in memory accessible to the processor and the processor can use either a current acoustic condition or a current stickiness control parameter in conjunction with the relationship to estimate or determine the expected value and display the undetermined value.

After determining an expected acoustic condition or an expected stickiness control parameter an actual value can be determined. The actual value can then be compared to the expected value. If the expected value does not equal to or does not fall within a predetermined range of the actual value, an operator can be alerted that one or more operational parameters should be adjusted or one of more polymerization sensors is providing incorrect data, for example. The predetermined range can require that the actual estimated value fall within about 40% or less, about 35% or less, about 30% or less, about 25% or less, about 20% or less, about 15% or less, about 10% or less, about 5% or less, or about 3% or less of the expected value. If the actual value does not fall within the predetermined range an alarm or other signal via a display device can alert an operator that current conditions within the reactor are not optimal and that a discontinuity event may be occurring or may be likely to occur therein. The operator can take corrective action(s) to either stop or reduce the likelihood of the discontinuity event.

Operational or process changes that can be taken in response to an acoustic condition and/or a stickiness control parameter that indicates polymer stickiness or an increased probability of polymer stickiness within the reactor can include, but are not limited to, adjusting the concentration of one or more reaction medium constituents, the temperature and/or pressure within the reactor, the recycle feed removal rate from the reactor, the rate of introduction of make-up feed and/or the recycle feed to the reactor, the rate of polymer product removal from the reactor, and/or the rate of catalyst introduction to the reactor. The reaction medium constituents can include, but are not limited to, the concentration of ICAs, inert gases, comonomers, isomers of the comonomers, the amount and type of catalyst(s), hydrogen or other chain transfer agents, water, carbon dioxide.

Returning to the estimation of an acoustic condition, the one or more acoustic condition sensors can detect the onset of polymer stickiness within the reactor by monitoring a running average of readings from the one or more acoustic condition sensors positioned about to the reactor. In one or more embodiments, an acoustic condition can be determined or estimated from a single reading of the acoustic condition sensor. Alternatively, in one or more embodiments, an acoustic condition can be determined or estimated from a plurality of readings from the acoustic condition sensor. For example, an acoustic condition can be determined or estimated from a running average of readings. A running average of readings can be determined or estimated using a "moving time window" averaging method. The average can be defined as the sum of n individual readings in a time window divided by n:

$$\overline{X} = \frac{\sum_{i=1}^{n} X_i}{n} \quad (1)$$

where $\overline{X}$ is the running average and $X_i$ is an individual reading. The n individual sample points can preferably be collected at equally spaced time intervals within the window. Suitable time windows for the time window averaging can range from 0.01 to 1000 seconds, or from 0.1 to 750 seconds, or from 1 to 500 seconds. An increase in polymer stickiness can be indicated by a decrease in the running average signal, defined as a decrease of one or more standard deviations of that signal. The standard deviation ("s") can be computed by the equation:

$$s = \sqrt{\frac{\sum_{i=1}^{n}(X_i - \overline{X})}{(n-1)}} \quad (2)$$

where $X_i$ is an individual reading of an acoustic condition sensor within the window, n is the total number of readings, and $\overline{X}$ is the running average of the acoustic condition signal, described above. The number of sample points used in the calculation of standard deviation is equal to the number of sample points involved in the calculation of the running average. If, for example, the time window for computing the running average is 60 seconds, and the sampling frequency is 10 points per second, then n is equal to 600. The sample points $X_i$ used in the calculation of standard deviation can be the same as those used in the running average calculation.

The total number of samples n involved in the calculations, (equal to the product of the time window during which samples are taken and the sampling frequency) can range from about 10 to about 100,000 or from about 50 to about 10,000, and increasing stickiness of reactor contents can be indicated by a decreasing level of acoustic conditions in the reactor, i.e., by a "quieter" bed, in terms of its acoustic conditions signal.

In one or more embodiments, operational conditions within the reactor can be adjusted or controlled when the acoustic condition drops to a negative deviation of 0.1, or 0.25, or 0.5, or 0.75, or 1, or 2, or 3, or 4, or 5, or 6, or more standard deviations below a predetermined value. The predetermined value or predetermined acoustic condition can be, for example, a known acoustic condition value, e.g. a known voltage, at which the polymer particles have a reduced probability of becoming sticky. The operational conditions that can be adjusted include, for example, the concentration of one or more induced condensing agents, comonomers, isomonomers of the comonomers, inert gases, water, catalyst(s), hydrogen, and/or carbon dioxide, the temperature within the reactor, the pressure within the reactor, or any combination thereof.

Returning to the estimation of the stickiness control parameter, FIG. 2 depicts an illustrative Differential Scanning calorimeter ("DSC") melting curve 205 of a polymer. A typical or normal reactor temperature is indicated by reference number 210. The melting peak temperature for the exemplary polymer is the peak of the DSC melting curve 205 and is indicated by reference number 225. The melt initiation temperature (MIT) for the exemplary polymer is indicated by reference number 215 and is taken as the point of rapid onset of melting, which in this DSC melting curve 205 is the point where the DSC melting curve 205 departs the x-axis. The maximum temperature at which the reactor can be operated, without the polymer becoming sticky (the "sticking point temperature" or "$T_S$"), is indicated by reference number 220. Stickiness in the polymer can be induced if the temperature within the reactor increases to a point at which it overlaps the polymer melting curve 205 too much. For Ziegler-Natta catalyzed polymers, the $T_S$ occurs when approximately 15% overlap occurs (i.e., 15% of the crystalline fraction of the polymer has melted). For metallocene catalyzed polymers, a higher degree of overlap is required to induce stickiness. While the exact number is not currently known for metallocene catalyzed polymers, it is believed that the degree of overlap required to induce stickiness is in the range of about 30% to 40%. Should the temperature within the reactor exceed the $T_S$, the polymer being produced within the reactor can begin to stick to the surfaces of the reactor. There are at least two characteristic melting behaviors (melt reference temperatures) illustrated in FIG. 2, which are the MIT 215 and the melting peak temperature 225.

By way of example, for a typical LLDPE polymer (0.9165 g/cm$^3$ density, MI of 1 dg/min) the melting temperature of the polymer can be in the range of from about 119° C. to about 127° C. (as measured dry, without dissolved components). For typical LLDPE polymers the temperature of the reactor would normally be operated at about 84° C. to about 87° C.

Temperature data indicative of a dry MRT, i.e. a polymer produced in the absence or substantial absence of ICAs and comonomers, can be acquired during production of the polymers and stored for later use, for example in a computer database. In one or more embodiments, the temperature data indicative of the dry MRT can be determined in a lab or other area outside of the reactor, i.e. not during the production of the polymers. Additional polymer properties, e.g. melt index ("MI") and density, can also be determined for the polymers, which can be used to estimate the MRT$_R$ of the dry MRT. As used herein, the term "MI" denotes melt index (I$_2$) as measured by ASTM-D-1238-E (190° C., 2.16 kg). Also, as used herein, the terms "density," "polymer density," and "polymer density" refer to the intrinsic material density of the polymer as measured in accordance with ASTM-D-1505-98.

As discussed and described above, a melt reference temperature depression model and a dry melt reference temperature can be used to estimate the reduced melt reference temperature from at least one monitored reaction parameter. For example, a mathematical correlation of the dry MRT as a function of the density and melt index for a polymer can be determined or estimated. Other variables, such as the particular catalyst used to produce the polymer(s) and other process variables (e.g. bed temperature, density and melt index of the polymer, concentration of ICAs, comonomers and isomonomers thereof, and other diluents within the reactor), can also be accounted for in the melt reference temperature depression model.

Dry MRT data stored in, for example, a table or database can be used to identify the dry MRT for a particular polymer subsequently produced in the reactor. For example, dry MRTs for a set of polymers, as determined by the density and melt index, can be prepared and compiled into the table or database, which can later be referred to during production of the same polymer at a later point in time. The dry MRT data, along with other data, such as corresponding melt indices and densities for each polymer corresponding to the dry MRT in the set, can be stored in the database and can be accessed by a processor, for example, when estimating a stickiness control parameter.

Example

Determination of Stickiness Control Parameter

The foregoing discussion on the determination of the stickiness control parameter (dMRT) can be further described with reference to the following non-limiting examples. Melt DSC measurements were made for a series of polymers that included both LLDPEs and VLDPEs, produced with a variety of catalysts and in the absence of ICAs and comonomers. Table 2 shows the melt index (MI) and density ($\rho$) of each polymer (Examples 1-17), the catalyst employed to produce the polymer, and the MIT and melting peak temperature for each polymer. The densities of the polymers range from 0.909 g/cm$^3$ to 0.966 g/cm$^3$ and the melt indices range from 0.81 g/10 min to 19.0 g/10 min. A plaque of each polymer was made and annealed for one hour at 100° C. to approach equilibrium crystallinity; measurement for density was then made in a density gradient column. The MI for each polymer was measured in accordance with ASTM D 1238-E (190° C., 2.16 kg).

Catalyst A is a metallocene catalyst whose preparation is described on pages 15-16 of PCT Publication No. WO 96/39450A1. Catalyst B is a metallocene catalyst identified as Catalyst "D" in PCT Publication No. WO 99/61486A1. Catalyst C is a supported Ziegler-Natta catalyst prepared according to U.S. Pat. No. 4,302,566. The polymer of Examples 1-17 were synthesized in a single fluidized bed reactor. The polymers in Examples 1-5 and 8 were prepared under dry conditions, i.e. in the substantial absence of ICAs and comonomers. The polymers in Examples 6, 7, and 9-17 were prepared under condensing conditions, i.e. in the presence of ICAs in the range of from 5 to 17 mol % and comonomers. In the reactor, polymerization reactions were performed at a temperature of from about 77° C. to about 120° C., depending on the particular polymer. Example reaction conditions are shown in Table 1 for the granular reactor products. The other Examples were prepared under similar processing conditions. Cx/C2 is the comonomer to ethylene ratio.

TABLE 1

| Example | Comonomer | Temp. (° C.) | Reactor Pressure (kPag) | Ethylene Pressure (kPaa) | H2/C2 (mol/mol) | Cx/C2 (mol/mol) |
|---|---|---|---|---|---|---|
| 6 | 1-Hexene | 85.2 | 2,124 | 1,234 | 0.00120 | 0.0103 |
| 9 | 1-Butene | 101 | 2,071 | 970 | 0.48600 | 0 |
| 10 | 1-Butene | 85 | 2,200 | 854 | 0.18100 | 0.3880 |
| 15 | 1-Hexene | 88 | 2,120 | 1,350 | 0.00027 | 0.0200 |

For each polymer evaluated, only the first DSC melting curve was used. The term "DSC melting curve" for a dry version of a polymer refers to an experimentally determined relationship between the rate at which heat is absorbed by a sample of the dry polymer (e.g., in units of mcal/sec) versus temperature of the sample, as determined from the DSC melting curve. Two types of DSC melting curves are "first melt" and "second melt" curves. A first melt curve is determined by measurements on a sample that has not previously been melted. A second melt curve is determined by measurements on a sample that has previously been melted. For example, the second melt curve is acquired from a polymer sample that has undergone melting in a first melt DSC run that has been cooled back to ambient temperature, and then reheated for the second melt curve. As discussed above, and not wishing to be bound by theory, it is believed that the first melt DSC is more representative of the polymer as it exists in the reactor than the more conventional second melt DSC curves. Second melt DSC curves can be significantly different than first melt DSC curves, typically showing lower melting peak temperatures and a sharper melting peak. In the data of Table 2 below, the DSC curves were generated using a TA Instruments model 2920 with a temperature ramp rate of 10° C./minute, and with a typical sample quantity of 4 to 5 mg.

TABLE 2

| Example | Catalyst | dry MIT (° C.) | Melting Peak Temp. (° C.) | MI (dg/min) | Density (g/cm3) |
|---|---|---|---|---|---|
| 1 | A | 87.1 | 114.2 | 1.0 | 0.909 |
| 2 | A | 86.0 | 110.1 | 7.8 | 0.912 |
| 3 | A | 85.1 | 113.3 | 1.0 | 0.913 |
| 4 | A | 85.5 | 108.4 | 11.7 | 0.912 |
| 5 | A | 86.0 | 110.2 | 5.1 | 0.912 |
| 6 | A | 97.4 | 116.1 | 1.0 | 0.917 |
| 7 | A | 96.4 | 122.2 | 0.8 | 0.924 |
| 8 | A | 95.5 | 113.3 | 3.4 | 0.917 |
| 9 | C | 111.2 | 127.5 | 1.9 | 0.942 |
| 10 | C | 125.8 | 135.5 | 8.2 | 0.966 |
| 11 | C | 97.0 | 121.8 | 1.0 | 0.918 |
| 12 | C | 97.7 | 119.5 | 2.0 | 0.918 |
| 13 | C | 95.0 | 122.6 | 22.0 | 0.925 |
| 14 | C | 108.7 | 127.0 | 3.3 | 0.935 |
| 15 | C | 116.0 | 128.1 | 19.0 | 0.953 |
| 16 | B | 96.9 | 113.8 | 1.1 | 0.921 |
| 17 | B | 85.4 | 110.6 | 4.6 | 0.912 |

Figure 3:
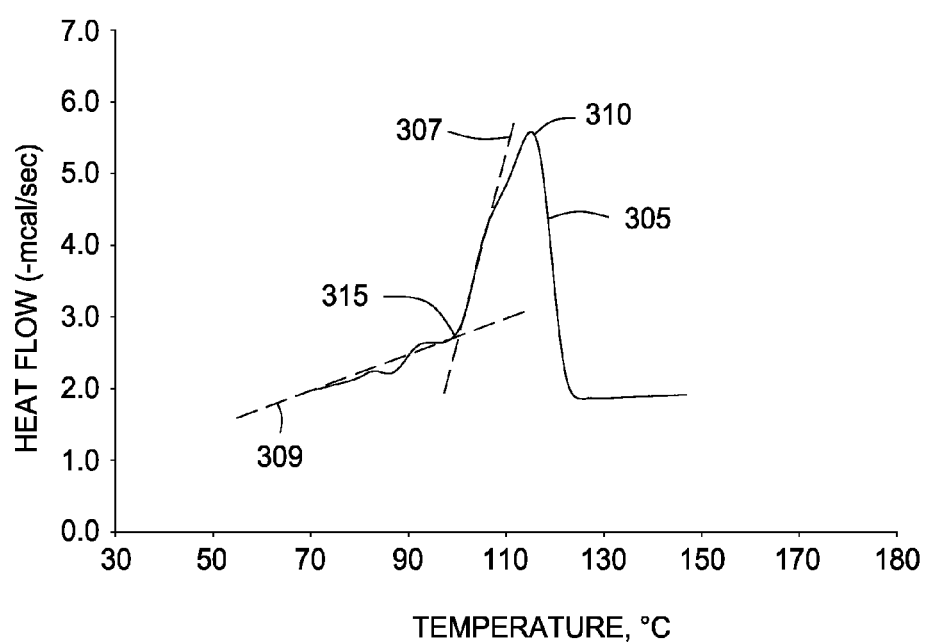
FIG. 3 depicts a first melt DSC curve generated from measured data for a polyethylene polymer having a dry melt initiation temperature ("MIT") value of 97.4° C.
Figure 4:
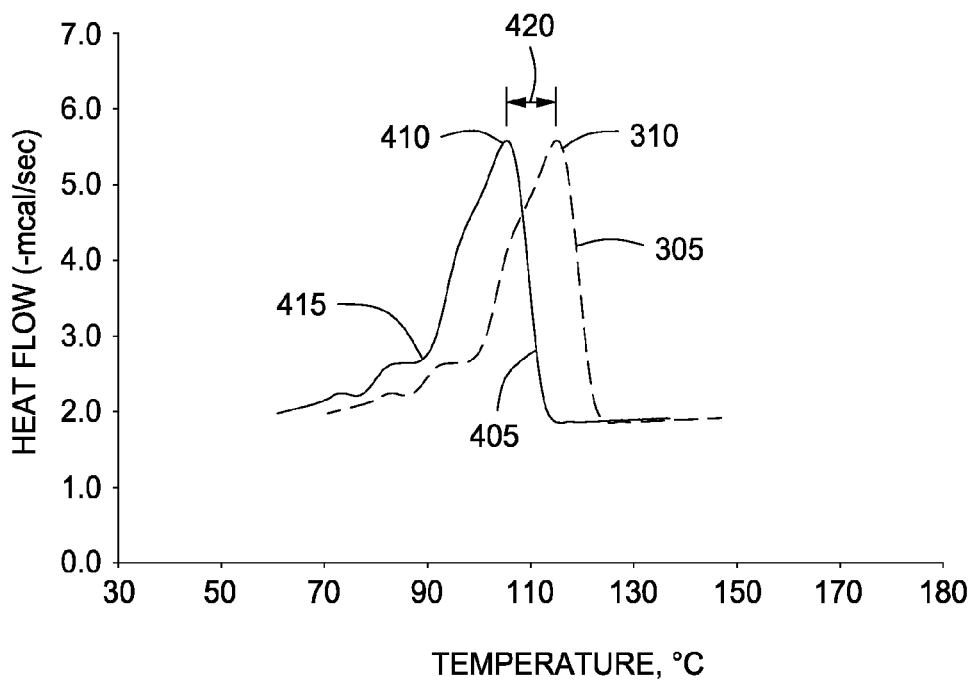
FIG. 4 illustrates the shifting effect that dissolved hydrocarbons have on the DSC curve of the polymer shown in FIG. 3, namely shifting the curve to lower temperatures.
Figure 5:
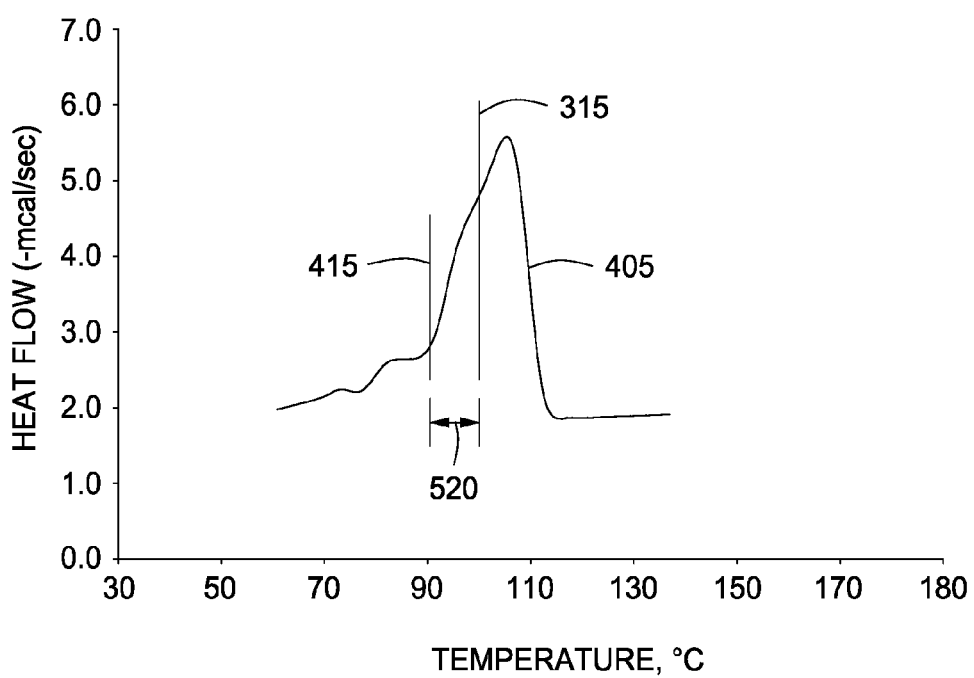
FIG. 5 depicts a graphical representation of the degree of shift or reduction in the melt initiation temperature of the polymer shown in FIG. 4.

FIGS. 3-5 illustrate the determination of a stickiness control parameter (dMRT), specifically a dMIT, for the polymer of Example 6. For FIGS. 3, 4 and 5, the units for the Y axis are -mcal/sec. The heat flow can range from about 4 to 26-mcal/sec depending upon the polymer sample. For FIG. 3, the peak maximum is about 5.5-mcal/sec. FIG. 3 depicts a first melt DSC curve 305 generated from measured data for the polymer having a dry melt initiation temperature (MIT) of 97.4° C., which is indicated by reference number 315. The dry MIT value can be determined or estimated graphically as the intersection of the two tangent lines 307, 309, as shown. The MIT 315 was taken as the point of rapid onset of melting and is the intersection of the two tangent lines 307 and 309. For this particular polymer, the melting peak temperature was determined to be 116.1° C. and is indicated by reference number 310.

FIG. 4 illustrates the effect that dissolved hydrocarbons have on the polymer melt curve 305, specifically to shift the curve to lower temperatures. The shifted curve is shown as curve 405. The effect of the dissolved components, principally dissolved comonomer and ICA, has been assumed to displace the entire melt curve 305 to lower temperatures, resulting in the displaced or shifted curve 405. The polymer melting peak temperature 310 and the MIT 315 are displaced or shifted to lower temperatures indicated by 410 and 415, respectively. The amount of displacement was 13° C., and is denoted by reference number 420. The amount of displacement 420 was calculated using the Flory equation and appropriate data (or correlations) for the solubility of condensable hydrocarbons in the polymer. The displaced value of MIT (reference number 415) is also referred to as the reduced melt initiation temperature or $MIT_R$.

Assuming a dry MRT (e.g. a dry MIT) has been determined; the stickiness control parameter can be estimated, in one example, as follows. As indicated by thermodynamic considerations, the presence of a soluble, condensable substance (e.g., a hydrocarbon) reduces the melting temperature of a polymer. The Flory equation, for the melting point depression of a high molecular weight polymer by a diluents, is given in Fried, J. R., Polymer Science and Technology, Prentice Hall, Upper Saddle River, N.J., 1995, as:

$$\frac{1}{T_m} - \frac{1}{T_m^0} = \left(\frac{R}{\Delta H u}\right)\left(\frac{Vu}{Vs}\right)(\phi_1 - \chi \phi_1^2) \quad (3)$$

where: R is the gas constant, Vu is the molar volume of the polymer repeat unit (cm³/g-mole), Vs is the molar volume of the diluent (cm³/g-mole), $T_m$ is the peak melting temperature of the polymer with diluent (° C.), $T_m^0$ is the peak melting temperature of the polymer without diluent (° C.), ΔHu is the enthalpy of fusion for the polymer repeat unit (850.6 cal/mol), $\phi_1$ is the volume fraction of diluent (single or multi-component), and χ is a binary interaction parameter.

The parameter χ is defined by the above reference as:

$$\chi = \chi_S + \chi_H = \chi_S + \frac{V_1}{RT}(\delta_1 - \delta_2)^2 \approx 0.34 + \frac{V_1}{RT}(\delta_1 - \delta_2)^2 \quad (4)$$

where: $\delta_1$ is the solubility parameter of the diluent, and $\delta_2$ is the solubility parameter of the polymer. For a diluent that is a mixture of gases:

$$\delta_1 = \delta_{mix} = \Sigma \delta_i f_i \quad (5)$$

where $f_i$ is the volume fraction of diluent component i, and $\delta_i$ is the solubility parameter of component i, and where the sum of volume fractions for all diluent components equals 1. Equation 5 is substituted into Equation 4 to calculate χ for mixtures.

Solving for $T_m$ in Equation 3, the following expression is obtained:

$$Tm = \frac{1}{\frac{1}{Tm^0 + 273.15} + \left[\frac{R}{\Delta H u} \cdot \frac{Vu}{Vs} \cdot (\phi_1 - \chi \cdot \phi_1^2)\right]} - 273.15 \quad (6)$$

This equation predicts the peak melting temperature of a polymer as a function of soluble components. In the example, $T_m^0$ is the peak melt temperature determined from a first melt DSC curve for the polymer, and $T_m$ is the peak melt temperature expected for the polymer in the presence of the diluent. As indicated by thermodynamic considerations, the effect of the soluble diluents is to reduce or depress the melting peak temperature, hence $T_m$ is always less than $T_m^0$ in the presence of one or more soluble diluents, and the difference $T_m^0 - T_m$ is always positive.

The depression of the MIT can be taken as equal to the depression of the melting peak temperature, as determined above from the Flory equation. Defining the parameter D as the depression (or displacement) of the melt initiation temperature, $$D = T_m - T_m^0 \quad (7)$$

The reduced melt initiation temperature can be determined from the melt initiation temperature as:

$$MIT_R = MIT - D \qquad (8)$$

In the example, the stickiness control parameter can be the temperature value $dMIT = T_{RX} - MIT_R$, where $T_{RX}$ is the current reactor temperature, and $MIT_R$ is given by Equation 8. The value dMIT is the difference between the reactor temperature ($T_{RX}$) and the melt initiation temperature of the polymer, accounting for the depression in melting point due to soluble hydrocarbons. A positive of dMIT value indicates the extent to which the reactor temperature exceeds the depressed melt initiation temperature.

In order to use Equation 6, relationships for the solubility of diluent components in the polymer are required. One such generalized relationship, described in Stiel, L. I. et al., J. Appl. Poly. Sci., v. 30, 1145-1165, 1985, provides an estimate of a Henry's Law constant as:

$$\ln\left(\frac{1}{Kp}\right) = -1.561 + (2.057 + 1.438\omega)\left(\frac{Tc}{T}\right)^2 \qquad (9)$$

where: Kp is Henry's Law constant, ω is an acentric factor, Tc is the critical temperature (K) of the diluent, and T is the temperature (K).

To calculate the vapor solubility, the following equation was presented by Stiel et al.:

$$P_T y_1 = Kp \cdot V_1^0 \qquad (10)$$

where: $P_T$ is the reactor total pressure (atm), y1 is vapor phase mole fraction, and $V_1^0$ is vapor solubility in cm³ diluent/g polymer at 273.2 K and 1 atmosphere pressure.

By combining Equations 9 and 10, and using the ideal gas equation to convert the volume of dissolved vapor to mass, the vapor solubility of diluent (in units of weight fraction) can be expressed as:

$$S = P \cdot Mw \cdot \frac{\exp\left(-1.561 + (2.057 + 1.438\omega)\left(\frac{Tc}{T}\right)^2\right)}{R \cdot Ta} \qquad (11)$$

where: Ta is 273.15 (K), R is the gas constant (82.06 cm³·atm/mol·K), and Mw is the molecular weight of the diluent and P is the partial pressure ($P_T y_1$), or:

$$S = P \cdot Mw \cdot \frac{\exp\left(-1.561 + (2.057 + 1.438\omega)\left(\frac{Tc}{T}\right)^2\right)}{22414.7} \qquad (12)$$

If P is in units of bars (rather than atmospheres), the constant in the denominator of Equation 12 is 22710.9.

Component properties, such as Tc, ω, and Mw may be found in Reid, R. C. et al., The Properties of Gases and Liquids, 4th ed., McGraw-Hill, New York, 1987.

To calculate the melting point depression by Equation 6, the volume fraction of diluent φ in the polymer must be estimated. Assuming additive volumes, the following relationship applies:

$$\phi_{mix} = \frac{\frac{Ms}{\rho s}}{\frac{Ms}{\rho s} + \frac{1 - Ms}{\rho_p}} \qquad (13)$$

where: Ms is the mass fraction of diluent, ρs is the density of the diluent (g/cm³), and ρp is the density of the polymer (g/cm³).

Other vapor solubility equations can be used as alternatives to Equation 12. For example, for polymerization reactions in which ethylene is present and isopentane is used as a diluent, the following relationship for vapor solubility S (in units of weight fraction) can be used:

$$S = a(1-\rho)^{b1} MI^c e^{d/T_{RX}} P^e \qquad (14)$$

where: MI is the polymer melt index ($I_2$, g/10 min), ρ is the polymer density (g/cm³), $T_{RX}$ is the reactor temperature (K), P is the hydrocarbon partial pressure at the polymer conditions (psia), and a, b1, c, d, and e are predetermined parameters.

As another example, for polymerization reactions in which 1-butene and 1-hexene are present as diluents, the following relationship for vapor solubility S (in units of weight fraction) can be used:

$$S = aPe^{\left(\left(b1 + \frac{b2}{T} - b3\right)P\right)} e^{c/T_{RX}} (1-\rho)^d MI^e \qquad (15)$$

where: MI is the polymer melt index ($I_2$, g/10 min), ρ is the polymer density (g/cm³), $T_{RX}$ is the reactor temperature (K), P is the hydrocarbon partial pressure at the polymer conditions (psia), and a, b1, c, d, and e are predetermined parameters.

In this example, diluent mixture molar volumes are required. Well known methods such as the Rackett method using the Chueh-Prauxnitz mixing rules or the Hankinson-Brobst-Thomson method for mixtures may be used. Molar volumes used herein were calculated using the modified Rackett method using the Chueh-Prausnitz mixing rules (as described in Reid, R. C., et al., The Properties of Gases and Liquids, 4th ed., McGraw-Hill, New York, 1987).

To estimate χ in Equation 6, the volume fraction of each soluble component is also required. In this example, the χ parameter was computed by modifying Equation 4 as follows:

$$\chi = 0.34 + \frac{V_1}{RT_{RX}}\left(\sum_i \delta_i \frac{S_i}{\sum_i S_i} - \delta_P\right) \qquad (16)$$

where: $\delta_P$ is polymer solubility parameter, $\delta_i$ is the solubility parameter of diluent component i, $S_i$ is defined by Equation 12, and the temperature T is taken as $T_{RX}$.

FIG. 5 illustrates the degree of shift or reduction in the melt initiation temperature for the polymer of Example 6, which is indicated by reference number 520. Reference number 520 shows the shift in position of the melt initiation temperature without diluent 315 (from FIG. 3) to the melt initiation temperature with diluent 415 (from FIG. 4). The stickiness control parameter (dMIT) was estimated as $dMIT = T_{RX} - MIT_R$, and represents the extent by which the temperature within the reactor exceeded or overlapped the displaced value of the MIT. The dMIT incorporates all known process variables that affect polymer stickiness (e.g., polymer density and MI, reactor temperature $T_{RX}$, and hydrocarbon concentrations and solubilities) into a single variable that can be monitored during a polymerization reaction, e.g. "on-line," and may be used as the basis for control of the reactor to prevent problems associated with excessive stickiness, and/or to maximize reactor production rates. As discussed and described above, limiting values of dMIT correspond to limiting values of stickiness, and can be different for different catalyst systems. For polymers produced with Catalyst A, the limiting value of dMIT was determined to be in the range of about 6° C. to about 8° C.

The melt initiation temperatures listed in Table 2 were regressed to determine a "best fit" by the least squares method, using the density and natural logarithm of the melt index (ln(MI)) for the relevant polymers. The regression line was:

$$MIT = 763.4\rho - 1.7524 \ln(MI) - 606.09 \quad (17)$$

where $\rho$ represents the density of the polymer (in units of g/cm$^3$, ASTM), and MI represents the melt index, $I_2$, of the polymer (in units of dg/min, ASTM). In this particular example, the regression line equation does not employ a term to account for the specific catalyst type used to produce the polymer. This is appropriate, however, because all combinations of polymer and catalyst types for which DSC measurements were performed were found to fit the correlation of the regression line equation shown above. However, it is anticipated that polymers produced by other catalyst systems may have MITs that do not fit the regression line equation. In such situations, it may be beneficial to include a term that accounts for the variations due to the different catalysts.

A melt initiation temperature depression model using the values listed in Table 2 was coded into an Excel spreadsheet, for application to the polymerization of polyethylene with typical condensable gas components ($C_4$ olefins, $C_4$ saturates, $C_6$ olefins, $C_6$ saturates and isopentane). Solubility parameters for these gases were obtained from the *Chemical Properties Handbook* ©1999, and are listed in Table 3 below. A value for the of solubility parameter of polyethylene was obtained from an average of several values that are listed for polyethylene in the *Polymer Handbook, 4$^{th}$* ed.

TABLE 3

| Solubility Parameters ((cal/cm3)1/2) | |
| --- | --- |
| 1-Butene | 6.717 |
| n-Butane | 7.062 |
| Isopentane | 6.771 |
| 1-Hexene | 7.352 |
| n-Hexane | 7.323 |
| Polyethylene | 7.95 |

Table 4 shows the results obtained from the coded melt initiation temperature depression model for a polymer of the type produced by Catalyst A, with a melt index (MI) of 1.04 dg/min (ASTM), and a density of 0.917 g/cm$^3$ (ASTM), produced in a fluidized bed reactor. The calculation was based on assumed values of condensable diluent gas concentrations, temperature, and pressure (as provided in Table 4) that are believed to be representative of Catalyst A in commercial operation.

TABLE 4

| | |
| --- | --- |
| 1-Hexene partial pressure (bar) | 0.217 |
| Isopentane partial pressure (bar) | 3.45 |
| Reactor temperature, $T_{RX}$ (° C.) | 85 |
| Reactor pressure (bar) | 21.7 |
| Polymer melting peak temp., $T_m^°$ (° C.) | 115.86 |
| Melt point depression, (° C.) | 13 |
| Reduced melting peak temp., $T_m$ (° C.) | 102.86 |
| Melt initiation temp., MIT (° C.) | 94.71 |
| Reduced MIT, $MIT_R$ (° C.) | 81.71 |
| dMIT, at $T_{RX}$ = 85° C. | 3.38 |

The melting point depression was determined using the indicated values of temperature and diluent gas concentrations, according to the method discussed and described above. The calculated melting point depression value was 13° C. $MIT_R$ was determined as the difference between the MIT and the melting point depression and was 94.71-13.00=81.71° C. Since this was lower than the reactor temperature ($T_{RX}$) of 85° C., the calculation thus determined that the system, in this particular example, was operating with a positive value of dMIT equal to 3.38° C. Since this was less than the limiting range of dMIT values that apply for Catalyst A (6 to 8° C.), the reactor would be expected to operate at the conditions above without excessive polymer stickiness in the fluidized bed and, consequently, without an increased tendency for discontinuity events caused by excessive stickiness.

Use of the above-described MIT depression model (or any other MRT depression model) allows linkage of polymer properties reactor operating conditions to predict the conditions required to avoid discontinuity events due to polymer stickiness during start-ups as well as steady-state operation. Use of the depression model also allows production rates to be maximized (i.e., to proceed with maximum combinations of reactor temperature and ICA) while avoiding or minimizing conditions in the reactor (or combinations of conditions) that can lead to excessive stickiness and discontinuity events.

Determination or estimation of the stickiness control parameter (dMRT) can be subject to error. For example, should the temperature sensor(s) used to estimate the temperature within the reactor provide inaccurate data, the estimated dMRT can be incorrect. By way of illustration, a temperature sensor that has a layer of polymer buildup deposited about the temperature sensor could provide a false/inaccurate temperature reading within the reactor. Other error inducing events can include, but are not limited to, a damaged temperature sensor, e.g. a damaged thermocouple; a drift in a temperature reading, e.g. change in calibration of the temperature sensor; incorrect gas composition estimation via a gas chromatograph; and/or incorrect polymer properties, such as density and MI. If any of these values are incorrect, the calculation of the stickiness control parameter will also be incorrect.

In one or more embodiments, the acoustic condition sensor(s) can be used to verify or cross-check that the dMRT, estimated from the temperature data, was estimated within an acceptable or predetermined range of accurateness or reliability. Likewise, the estimated dMRT can be used to verify or cross-check acoustic condition data provided from the acoustic condition sensor(s). During operation of the reactor, the acoustic sensors provide an output signal that can indicate the degree or level of polymer stickiness within the reactor. A table or set of data provided from the one or more acoustic condition sensors can be prepared and stored, similar to the dry MRTs, such that reference can be made thereto during operation of the reactor. As such, both the data from the acoustic condition sensor(s) and the estimated dMRT can be compared and cross-checked with one another to provide a more reliable and accurate estimation of the degree of polymer stickiness within the reactor. Furthermore, determination or estimation of the dMRT reduces or eliminates the need to operate the reactor under dry runs, i.e. preparation of a series of polymers in the absence of ICA's and/or comonomers, in order to acquire the data necessary to interpret acoustic data acquired during normal operation of the reactor, i.e. production of polymers in the presence of ICA's, comonomers, etc.

Figure 6:
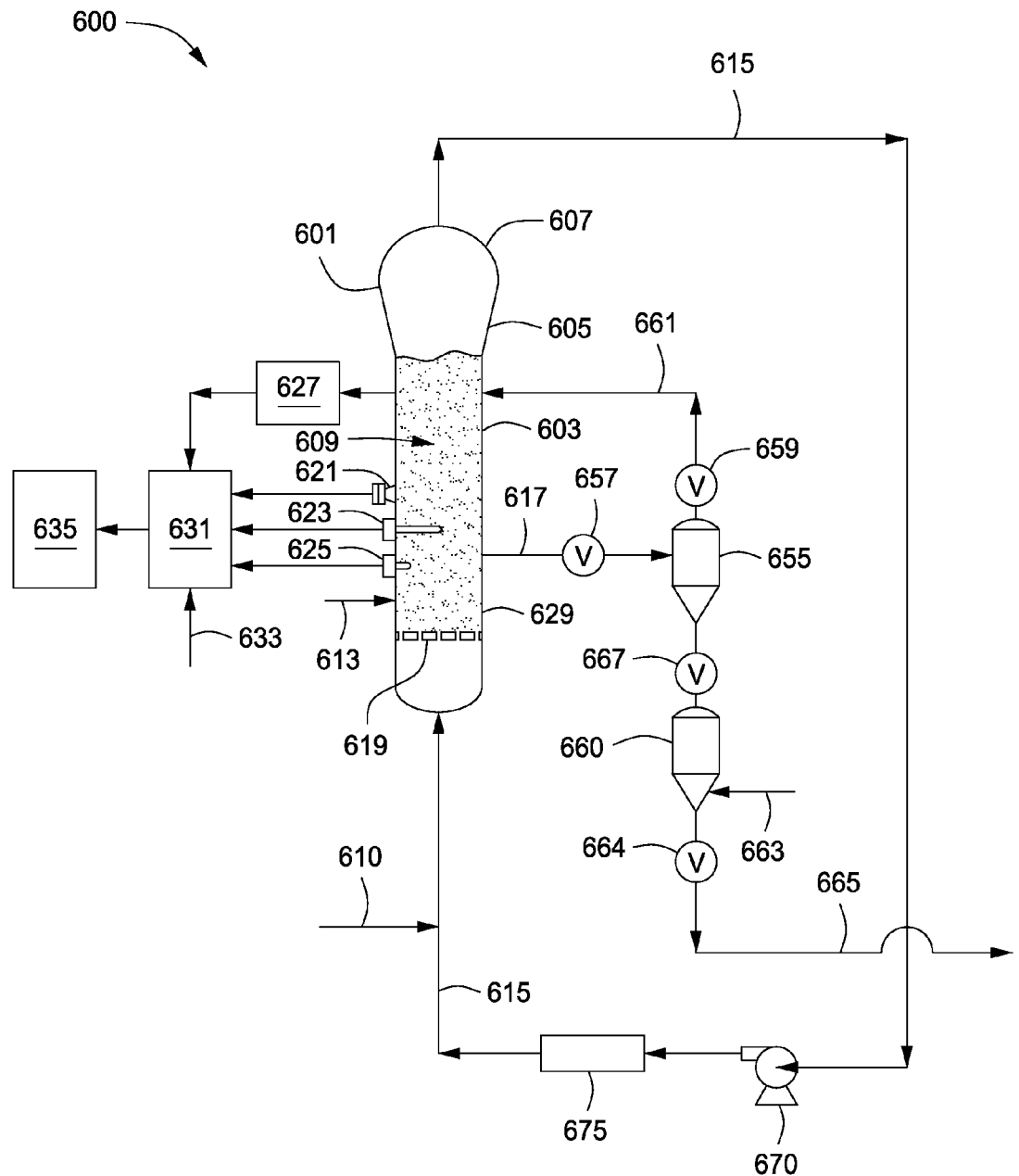
FIG. 6 depicts a flow diagram of an illustrative gas phase system for making polyolefins.

FIG. 6 depicts a flow diagram of an illustrative polymerization system 600 for making polyolefins according to one or more embodiments. In one or more embodiments, the system 600 includes a reactor 601 in fluid communication with one or more discharge tanks 655 (only one shown), surge tanks 660 (only one shown), recycle compressors 670 (only one shown), and heat exchangers 675 (only one shown). The polymerization system 600 can include more than one reactor 601, arranged in series, parallel, or configured independent from the other reactors, each reactor having its own associated discharge tanks 655, surge tanks 660, recycle compressors 670, and heat exchangers 675. Alternatively, two or more reactors 601 may share any one or more of the associated discharge tanks 655, surge tanks 660, recycle compressors 670, and heat exchangers 675. For simplicity and ease of description, embodiments of the invention will be further described in the context of a single reactor train.

In one or more embodiments, the reactor 601 can include a cylindrical section 603, a transition section 605, and a dome or top head 607. The cylindrical section 603 can be disposed adjacent the transition section 605. The transition section 605 can expand from a first diameter that corresponds to the diameter of the cylindrical section 603 to a larger diameter adjacent the dome 607. The dome 607 has a bulbous shape. The cylindrical section 603 can include a reaction zone 609. The reaction zone can be a fluidized reaction bed or fluidized bed. In one or more embodiments, a distributor plate 619 can be disposed within the cylindrical section 603, generally at or toward the end of the cylindrical section that is opposite the end adjacent to the transition section 605. The reaction zone 609 can include a bed of growing polymer particles, formed polymer particles and catalyst particles fluidized by the continuous flow of polymerizable and modifying gaseous components in the form of make-up feed and recycle fluid through the reaction zone 609. The reactor 601 can further include one or more sensors disposed on, in, and/or thereabout. For example, the reactor 601 can include one or more acoustic condition sensors (one is shown 621), one or more reactor temperature sensors (two are shown 623, 625), and one or more gas chromatographs (one is shown 627) in communication therewith.

The fluidized bed has the general appearance of a dense mass of individually moving particles as created by the percolation of gas through the bed. The pressure drop through the bed is equal to or greater than the weight of the bed divided by the cross-sectional area. It is thus dependent on the geometry of the reactor. To maintain a viable fluidized bed in the reaction zone 609, the superficial gas velocity through the bed must exceed the minimum flow required for fluidization. Preferably, the superficial gas velocity can be at least two times the minimum flow velocity. In one or more embodiments, the superficial gas velocity can range from about 0.3 m/s to about 2 m/s, from about 0.35 m/s to about 1.7 m/s, or from about 0.4 m/s to about 1.5 m/s. Ordinarily, the superficial gas velocity does not exceed 1.5 m/s (5.0 ft/sec) and usually no more than 0.76 m/s (2.5 ft/sec) is sufficient. In general, the height to diameter ratio of the reaction zone 609 can vary in the range of from about 2:1 to about 5:1. The range, of course, can vary to larger or smaller ratios and depends upon the desired production capacity. The cross-sectional area of the top head 607 can be typically within the range of about 2 to about 3 multiplied by the cross-sectional area of the reaction zone 609.

An overhead line 615 can be in fluid communication with the dome 607, which can be recycled to the reaction zone 609. A feed or "make-up" feed via line 610 can be introduced to the recycle line 615 and catalyst particles can be introduced via line 613 to the reactor 601. A polymer product can be recovered via line 617 from the reaction zone 609.

The acoustic condition sensor 621 can be positioned on a reactor wall 629 and configured to detect acoustic conditions from the reaction medium. Data collected by the acoustic condition sensor 621 can be used, alone or in combination with other information or data, to perform one or more operations, calculations, and/or to determine, at least in part, one or more product properties or product conditions within the reactor 601. For example, the acoustic condition sensor 621 can be used to estimate an acoustic condition within the reaction zone 609. In one or more embodiments, the acoustic condition sensor 621 can be mounted on the exterior of a wall 629 of the reactor 601 and adjacent the reaction zone 609, for example. Any number of acoustic condition sensors 621 can be disposed about the reactor 601, e.g. 1, 2, 3, 4, 5, 6, 7, 8, 9, 10, 15, or 20 sensors.

A first temperature sensor 623 can provide data for determining or estimating the temperature of the reaction medium within the reaction zone 609. The first temperature sensor 623 can be configured and positioned to sense the temperature of the reaction zone 609 during operation of the reactor 601 at a location or position within the reaction zone 609 and away from the reactor wall 629. For example, the first temperature sensor 623 can extend into the reaction zone 609 about 15 cm, about 30 cm, or about 45 cm, or about 70 cm, or about 100 cm. The first temperature sensor 623 can be a thermocouple, for example. The first temperature sensor 623 can provide the temperature or an approximation thereof of the reaction medium within the reaction zone 609. Any number of first temperature sensors 623 can be disposed about the reactor 601, e.g. 1, 2, 3, 4, 5, 6, 7, 8, 9, 10, 15 or 20 sensors. The temperature of the reaction medium provided via the first temperature sensor 623 can be used, alone or in combination with other information or data, to perform one or more operations, calculations, and/or to determine, at least in part, one or more polymer properties and/or polymer conditions within the reactor 601.

In one or more embodiments, each first temperature sensor 623 can include a corresponding acoustic condition sensor 621. However, the number of first temperature sensors 623 can be different from the number of acoustic condition sensors 621. For example, three first temperature sensors 623 and one acoustic condition sensor 621 can be disposed about the reactor 601. Preferably, the acoustic condition sensor 621 can be disposed on the reactor wall 629 adjacent or proximate the location of a corresponding first temperature sensor 623 disposed within the reaction zone 609. In at least one specific embodiment, one acoustic condition sensor 621 can be used in conjunction with a plurality of first temperature sensors 623, for example, one acoustic condition sensor 621 can be disposed between two first temperature sensors 623.

One or more second or "skin" temperature sensors 625 can include a temperature sensor, such as a thermocouple, that slightly protrudes or extends through the reactor wall 629 and into the reaction zone 609, thus providing the temperature "$T_w$" of a reaction product at or near the wall 629 of the reactor 601 during operation. For example, the second temperature sensor 625 can extend a distance of about 0.25 cm to about 2 cm into the reaction zone 609. Any number of second temperature sensors 625 can be positioned on or about the reactor 601, e.g. 1, 2, 3, 4, 5, 6, 7, 8, 9, 10, 15, or 20 sensors.

The one or more gas chromatographs 627 can be used to determine or estimate the concentration of one or more gaseous components within the reactor 601. Illustrative components can include, but are not limited to, ICAs, monomers, comonomers, isomonomers, and inert gases. The gas chromatograph 627 can be in fluid communication with an internal volume of the reactor 601, for example, an internal volume of the reaction zone 609, the transition section 605, the dome 607, and/or the recycle line 615. In one or more embodiments, a plurality of gas chromatographs 627 can be disposed about and in fluid communication with the reactor 601 at one or more locations to provide information about the type and/or concentration of components within the reactor 601. The data provided via the gas chromatograph 627 can be used to determine one or more properties of a polymer being produced within the reactor 601 based on the gas phase concentrations, e.g. the melt index ("MI") of a polymer being produced within the reactor 601. The data provided from the gas chromatograph 627 can be used, alone or in combination with other information or data, to perform one or more operations or calculations and/or to determine or estimate, at least in part, one or more polymer properties and/or polymer conditions within the reactor 601.

In one or more embodiments, data provided from the acoustic condition sensor 621, temperature sensors 623 and 625, gas chromatograph 627, and/or other sensing devices can be provided to a processor 631, which can process the data. In one or more embodiments, additional data 633 can be introduced to the processor 631, which can be used in conjunction with data provided via the sensors 621, 623, 625, 627, and/or other sensors. Other additional data or types of data can include, but are not limited to, the type of catalyst introduced via line 613, the pressure within the reactor 601, the type or composition of the feed in line 610 and/or the recycle line 615, the flow rate of the feed via line 610, and the recycle feed via line 615.

In one or more embodiments, the processor 631 can be in communication with a read-out or display device 635, such as a printer, video screen, and/or audio device. One or more signals, e.g. visual and/or audio, can be generated and displayed and/or emitted via the display device 635. For example, the processor 631 can be connected to a digital display 635 that can provide information regarding current conditions within the reactor 601 and/or the polymerization system 600. The information provided via the display 635 can be used to indicate operational changes that should be implemented by operation personnel in order to increase polymer production via line 617, reduce the likelihood or probability of a discontinuity event, change the type of polymer product being produced within the reactor, or the like.

The feed via line 610 and the recycle feed via line 615 can be introduced into the reactor 601 at any point(s) or location(s). For example, the feed via line 610 and the recycle feed via line 615 can be combined and introduced to the reactor 601 below the distribution plate 619, above the distribution plate 619, in the transition section 605, or at any point within the recycle line 615. The feed via line 610 and the recycle feed via line 615 can be introduced to the reactor 601 at multiple and different locations. Although not shown, the feed via line 610 and the recycle feed via line 615 can be separately introduced to the reactor 601.

The feed in line 610 can be or include any raw material(s), either liquid, gas, or a combination of liquid and gas phase materials. The feed in line 610 can be reacted in the presence of one or more catalysts to provide the polymer product via line 617. In one or more embodiments, the feed in line 610 may comprise any olefin monomer, including substituted and unsubstituted alkenes having 2 to 12 carbon atoms, such as ethylene, propylene, butene, pentene, 4-methyl-1-pentene, hexene, heptene, octene, decene, 1-dodecene, styrene, 1-hexadecene, derivatives thereof, and/or combinations thereof. Also utilizable are polyenes, such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. The feed in line 610 can include any number of olefin monomers, for example ethylene and one or more comonomers having three to 12 carbon atoms. The feed via line 610 can be introduced to the reactor 601 to produce homopolymers of olefins (e.g., homopolymers of ethylene), and/or copolymers, terpolymers, and the like of olefins, particularly ethylene, and at least one other olefin. In various embodiments, the olefins, for example, can contain from 2 to 16 carbon atoms; or ethylene and a comonomer comprising from 3 to 12 carbon atoms; or ethylene and a comonomer comprising from 4 to 10 carbon atoms; or ethylene and a comonomer comprising from 4 to 8 carbon atoms. The feed in line 610 can also include one or more non-olefinic gases such as nitrogen, hydrogen, and/or carbon dioxide. In one or more embodiments, a comonomer can be present with ethylene in a mole ratio of comonomer to ethylene in the gas phase from, for example, about 0.0001 to 50, or about 0.0001 to 5, or about 0.0005 to 1.0, or about 0.001 to 0.5.

In one or more embodiments, hydrogen can be introduced to the reactor 601 to control or adjust one or more properties of the polymer products via line 617. For example, for some types of catalyst systems, increasing concentrations (or partial pressures) of hydrogen can increase the molecular weight or melt index (MI) of the polymer product recovered via line 617. The MI can thus be influenced by the hydrogen concentration. The amount of hydrogen in the polymerization can be expressed as a mole ratio relative to the total polymerizable monomer, for example ethylene or a blend of ethylene and hexane or propylene. The amount of hydrogen used in some polymerizations can be an amount necessary to achieve a desired MI (or molecular weight) of the final polymer product. In one or more embodiments, the mole ratio in the gas phase of hydrogen to total monomer ($H_2$:monomer) can be greater than about 0.00001. In one or more embodiments, $H_2$:monomer can be greater than about 0.0005, or greater than about 0.001 and less than about 10, less than about 5, less than about 3, or less than about 0.10. In one or more embodiments, the amount of hydrogen in the reactor 601 can be up to about 10 ppm, about 100 ppm, about 500 ppm, about 1,000 ppm, about 2,000 ppm, about 3,000 ppm, about 4,000 ppm, or about 5,000 ppm. In one or more embodiments, the amount of hydrogen in the reactor 601 can range from a low of about 10 ppm, about 150 ppm or about 250 ppm to a high of about 2,500 ppm, about 3,500 ppm, or about 4,500 ppm.

In one or more embodiments, the production rate of polymer product(s) via line 617 can be increased by introducing one or more diluents to the reactor 601. The one or more diluents can include, but are not limited to, induced condensing agents ("ICAs"), comonomers, isomers of the comonomers, and combinations thereof. ICAs, for example, can be condensable under the conditions encountered within a polymerization system 600, e.g. temperature and pressure. Introducing one or more ICAs to the reactor 601 is often referred to as operating the reactor in "condensed mode." ICAs are non-reactive in the polymerization process, but the presence of ICAs increases the production rate of a polymer within the reactor 601. ICAs increase the cooling capacity of the feed 615 introduced to the reactor 601 for a given reaction temperature and increase the dew point temperature of reactor gases. An increased cooling capacity and dew point temperature of reactor gases promotes an increased level of condensing, which increases the production rate of the polymer. Non-reactive ICAs can include, but are not limited to, alkanes that may be condensable in the polymerization process for removing the heat of reaction. Illustrative non-reactive alkanes include, but are not limited to, propane, butane, isobutane, pentane, isopentane, hexane, isohexane, isomers thereof, derivatives thereof, and/or combinations thereof.

However, there are limits to the concentration of condensable gases that can be introduced to the reactor 601. Furthermore, different polymers vary in their ability to tolerate ICA materials and other diluents without becoming sticky. For example, some polymers exhibit a relatively high tolerance (expressed in partial pressure of the ICA in the reactor), e.g. 345 kPa (50 psi), while other polymers can only tolerate 34.5 kPa (5 psi) or less. For the latter polymers, the heat transfer-limited production rates under similar conditions are substantially lower. Polymers that possess a uniform comonomer composition distribution tend to have higher tolerances to the amount of ICAs that can be present in the reactor. For example, polymers produced using metallocene catalysts may have more uniform comonomer compositions and the ability to tolerate increased amounts of ICAs. However, at some point, polymers reach a limiting ICA concentration that induces stickiness. The limiting ICA concentration depends on several factors in addition to the polymer type, including, but not limited to, the particular ICA(s), the concentration of the ICA(s), temperature, particular comonomer(s), and/or the concentration of the comonomer(s). Further details regarding the effect that condensable gases can have on a polymerization process are discussed and described in U.S. Pat. Nos. 5,352,749; 5,405,922; 5,436,304; and 7,122,607; and PCT Publication Number WO 2005/113615(A2).

The velocity reduction zone or top head 607 has a larger inner diameter than the cylindrical section 603. As the name suggests, the velocity reduction zone or top head 607 slows the velocity of the gas due to the increased cross sectional area. This reduction in gas velocity allows particles entrained in the upward moving gas to fall back into the bed, allowing primarily only gas to exit overhead of the reactor 601 through recycle gas stream 615. In one or more embodiments, the recycle gas stream recovered via line 615 can contain less than about 10% wt, less than about 8% wt, less than about 5% wt, less than about 4% wt, less than about 3% wt, less than about 2% wt, less than about 1% wt, less than about 0.5% wt, or less than about 0.2% wt of polymer particles entrained in reaction zone 609.

The recycle stream via line 615 can be compressed in the recycle compressor 670 and then passed through the heat exchanger 675 where heat can be removed before returning the recycle stream to the reactor 601. The heat exchanger 675 can be of the horizontal or vertical type. If desired, several heat exchangers can be employed to lower the temperature of the recycle gas stream in stages. It is also possible to locate the recycle compressor 670 downstream from the heat exchanger or at an intermediate point between several heat exchangers 675. After cooling, the recycle stream 615 can be returned to the reactor 601. The cooled recycle stream 615 can absorb the heat of reaction generated by the polymerization reaction.

Preferably, the recycle stream 615 can be returned to the reactor 601 and to the fluidized bed through a fluid distributor plate or fluid deflector 619. The fluid deflector 619 can be preferably installed at the inlet to the reactor 601 to prevent contained polymer particles from settling out and agglomerating into a solid mass and to prevent liquid accumulation at the bottom of the reactor 601, as well as to facilitate easy transitions between processes which contain liquid in the recycle stream 615 and those which do not and vice versa. An illustrative deflector suitable for this purpose is described in U.S. Pat. Nos. 4,933,415 and 6,627,713.

A catalyst or catalyst system can be introduced to the fluidized bed within the reactor 601 through one or more injection nozzles (not shown) in fluid communication with line 613. The catalyst or catalyst system can preferably be introduced as pre-formed particles in one or more liquid carriers (i.e. a catalyst slurry). Suitable liquid carriers can include mineral oil and liquid hydrocarbons including, but not limited to, propane, butane, isopentane, hexane, heptane octane, or mixtures thereof. A gas that is inert to the catalyst slurry such as, for example, nitrogen or argon can also be used to carry the catalyst slurry into the reactor 601. In one or more embodiments, the catalyst or catalyst system can be a dry powder. In one or more embodiments, the catalyst or catalyst system can be dissolved in the liquid carrier and introduced to the reactor 601 as a solution.

Under a given set of operating conditions, the fluidized bed 609 can be maintained at essentially a constant height by withdrawing a portion of the bed as product via line 617 at the rate of formation of the particulate polymer product. Since the rate of heat generation is directly related to the rate of product formation, a measurement of the temperature rise of the fluid across the reactor (the difference between inlet fluid temperature and exit fluid temperature) can be indicative of the rate of particulate polymer formation at a constant fluid velocity if no or negligible vaporizable liquid is present in the inlet fluid.

Fluid can be separated from a particulate product recovered via line 617 from the reactor 601. The separated fluid can be recycled to the reactor 601. In one or more embodiments, this separation can be accomplished when fluid and product leave the reactor 601 and enter the product discharge tanks 655 (one is shown) through valve 657, which can be a ball valve designed to have minimum restriction to flow when opened. Positioned above and below the product discharge tank 655 can be conventional valves 659 and 667. The valve 667 allows passage of product into the product surge tanks 660 (only one is shown).

In at least one embodiment, to discharge particulate polymer from reactor 601, valve 657 can be opened while valves 659 and 667 are in a closed position. Product and fluid enter the product discharge tank 655. Valve 657 can be closed and the product can be allowed to settle in the product discharge tank 655. Valve 659 can then be opened permitting fluid to flow from the product discharge tank 655 to the reactor 601 via line 661. Although not shown, the fluid via line 661 can be introduced to the recycle line 615. Valve 659 can then be closed and valve 667 can be opened and any product in the product discharge tank 655 can flow into the product surge tank 660. Valve 667 can then be closed. Product can then be discharged from the product surge tank 660 through valve 664. The product can be further purged via purge stream 663 to remove residual hydrocarbons and conveyed via line 665 to a pelletizing system or to storage (not shown). The particular timing sequence of the valves 657, 659, 667, 664 can be accomplished by use of conventional programmable controllers which are well known in the art.

Another preferred product discharge system which can be alternatively employed is disclosed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed.

The fluidized-bed reactor 601 can be equipped with an adequate venting system (not shown) to allow for venting of the bed during start up, shut down, and operation. Isomeric compounds (isomers of comonomers) in reactor 601 can be relatively inert and can accumulate significantly within the reactor 601. As such, the isomeric compounds can be present in substantial amounts, which can have a substantial impact on the melting point depression and the reduced melt reference temperature $MRT_R$ of the polymer being produced in the reactor 601. Preferably, the accumulation of isomeric compounds within the reaction system 600 can be reduced or controlled via a venting system. Vented isomers can be introduced to a flare or to a recovery system separate from the recycle line 615.

The reactor 601 can be operated without the use of stirring and/or wall scraping. The recycle line 615 and the elements therein (recycle compressor 670, heat exchanger 675) can be smooth surfaced and devoid of unnecessary obstructions so as not to impede the flow of recycle fluid or entrained particles.

In addition to monitoring the polymerization system 600 by estimating an acoustic condition and/or a stickiness control parameter, various other techniques for preventing discontinuity events can be used. Illustrative of these techniques are the introduction of finely divided particulate matter to prevent agglomeration, as described in U.S. Pat. Nos. 4,994,534 and 5,200,477 and the addition of negative charge generating chemicals to balance positive voltages or the addition of positive charge generating chemicals to neutralize negative voltage potentials as described in U.S. Pat. No. 4,803,251. Antistatic substances can also be added, either continuously or intermittently, to prevent or neutralize electrostatic charge generation. Sonic cleaning of the interior walls of the reactor 601 can also be carried out, as described in U.S. Patent Publication No. 2006/0130870.

The conditions for polymerizations vary depending upon the monomers, catalysts, catalyst systems, and equipment availability. The specific conditions are known or readily derivable by those skilled in the art. For example, the temperatures can be within the range of about $-10°$ C. to about $120°$ C., or about $15°$ C. to about $110°$ C. Pressures can be from about 0.1 bar to about 100 bar, such as from about 5 bar to about 50 bar, for example. Additional details of polymerization can be found in U.S. Pat. No. 6,627,713, which is incorporated by reference at least to the extent it discloses polymerization details.

Considering the polymer product via line 665, the polymer can be or include any type of polymer or polymeric material. Illustrative polymers include, but are not limited to, polyolefins, polyamides, polyesters, polycarbonates, polysulfones, polyacetals, polylactones, acrylonitrile-butadiene-styrene polymers, polyphenylene oxide, polyphenylene sulfide, styrene-acrylonitrile polymers, styrene maleic anhydride, polyimides, aromatic polyketones, or mixtures of two or more of the above. Suitable polyolefins can include, but are not limited to, polymers comprising one or more linear, branched or cyclic $C_2$ to $C_{40}$ olefins, preferably polymers comprising propylene copolymerized with one or more $C_3$ to $C_{40}$ olefins, preferably a $C_3$ to $C_{20}$ alpha olefin, or $C_3$ to $C_{10}$ alpha-olefins. Preferred polyolefins include, but are not limited to, polymers comprising ethylene, including but not limited to ethylene copolymerized with a $C_3$ to $C_{40}$ olefin, preferably a $C_3$ to $C_{20}$ alpha olefin, such as propylene and/or butene.

Preferred polymer products include homopolymers or copolymers of $C_2$ to $C_{40}$ olefins, preferably $C_2$ to $C_{20}$ olefins, such as copolymers of an alpha-olefin and another olefin or alpha-olefin (ethylene can be defined to be an alpha-olefin). In one or more embodiments, the polymers are or include homopolyethylene, homopolypropylene, propylene copolymerized with ethylene and or butene, ethylene copolymerized with one or more of propylene, butene or hexene, and optional dienes. Examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymers of propylene and ethylene and/or butene and/or hexene, elastomers such as ethylene propylene rubber, ethylene propylene diene monomer rubber, neoprene, and blends of thermoplastic polymers and elastomers, such as for example thermoplastic elastomers and rubber toughened plastics.

Catalyst System

The catalyst system can include Ziegler-Natta catalysts, chromium-based catalysts, metallocene catalysts, and other single-site catalysts including Group 15-containing catalysts bimetallic catalysts, and mixed catalysts. The catalyst system can also include $AlCl_3$, cobalt, iron, palladium, chromium/chromium oxide or "Phillips" catalysts. Any catalyst can be used alone or in combination with the others. In one or more embodiments, a "mixed" catalyst can be preferred.

The term "catalyst system" includes at least one "catalyst component" and optionally at least one "activator," alternately at least one co-catalyst. The catalyst system can also include other components, such as supports, and is not limited to the catalyst component and/or activator alone or in combination. The catalyst system can include any number of catalyst components in any combination as described, as well as any activator in any combination as described.

The term "catalyst component" includes any compound that, once appropriately activated as necessary, is capable of catalyzing the polymerization or oligomerization of olefins. In some embodiments, the catalyst component includes at least one Group 3 to Group 12 atom and optionally at least one leaving group bound thereto.

The term "leaving group" refers to one or more chemical moieties bound to the metal center of the catalyst component that can be abstracted from the catalyst component by an activator, thereby producing the species active towards olefin polymerization or oligomerization. Suitable activators are described in detail below.

As used herein, in reference to Periodic Table "Groups" of Elements, the "new" numbering scheme for the Periodic Table Groups is used as set forth in the CRC Handbook of Chemistry and Physics (David R. Lide, ed., CRC Press $81^{st}$ ed. 2000).

The term "substituted" means that the group following that term possesses at least one moiety in place of one or more hydrogens in any position, the moieties selected from such groups as halogen radicals (for example, Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

Chromium Catalysts

Suitable chromium catalysts can include di-substituted chromates, such as $CrO_2(OR)_2$; where R is triphenylsilane or a tertiary polyalicyclic alkyl. The chromium catalyst system can further include $CrO_3$, chromocene, silyl chromate, chromyl chloride ($CrO_2Cl_2$), chromium-2-ethyl-hexanoate, chromium acetylacetonate ($Cr(AcAc)_3$), and the like.

Metallocenes

Metallocenes are generally described in, for example, 1 & 2 Metallocene-Based Polyolefins (John Scheirs & W. Kaminsky, eds., John Wiley & Sons, Ltd. 2000); G. G. Hlatky in 181 Coordination Chem. Rev. 243-296 (1999) and, in particular for use in the synthesis of polyethylene, in 1 Metallocene-Based Polyolefins 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The metallocene catalyst component can be supported on a support material in some embodiments, and can be supported with or without another catalyst component.

The Cp ligands are one or more rings or ring system(s), at least a portion of which includes π-bonded systems, such as cycloalkadienyl ligands and heterocyclic analogues. The ring(s) or ring system(s) typically comprise atoms selected from the group consisting of Groups 13 to 16 atoms, or the atoms that make up the Cp ligands are selected from the group consisting of carbon, nitrogen, oxygen, silicon, sulfur, phosphorous, germanium, boron and aluminum and combinations thereof, where carbon makes up at least 50% of the ring members. Alternatively, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind"), substituted versions thereof, and heterocyclic versions thereof.

Group 15-Containing Catalyst

The "Group 15-containing catalyst" can include Group 3 to Group 12 metal complexes, wherein the metal is 2 to 8 coordinate, the coordinating moiety or moieties including at least two Group 15 atoms, and up to four Group 15 atoms. In one embodiment, the Group 15-containing catalyst component can be a complex of a Group 4 metal and from one to four ligands such that the Group 4 metal can be at least 2 coordinate, the coordinating moiety or moieties including at least two nitrogens. Representative Group 15-containing compounds are disclosed in, for example, WO 99/01460; EP A1 0 893 454; EP A1 0 894 005; U.S. Pat. No. 5,318,935; U.S. Pat. No. 5,889,128 U.S. Pat. No. 6,333,389 B2 and U.S. Pat. No. 6,271,325 B1. In one embodiment, the Group 15-containing catalyst includes a Group 4 imino-phenol complexes, Group 4 bis(amide) complexes, and Group 4 pyridyl-amide complexes that are active towards olefin polymerization to any extent.

Activator

The term "activator" includes any compound or combination of compounds, supported or unsupported, which can activate a single-site catalyst compound (e.g., metallocenes, Group 15-containing catalysts), such as by creating a cationic species from the catalyst component. Typically, this involves the abstraction of at least one leaving group (X group in the formulas/structures above) from the metal center of the catalyst component. The catalyst components of embodiments described herein are thus activated towards olefin polymerization using such activators. Embodiments of such activators include Lewis acids such as cyclic or oligomeric poly(hydrocarbylaluminum oxides) and so called non-coordinating activators ("NCA") (alternately, "ionizing activators" or "stoichiometric activators"), or any other compound that can convert a neutral metallocene catalyst component to a metallocene cation that can be active with respect to olefin polymerization.

Lewis acids can be used to activate the metallocenes described. Illustrative Lewis acids include, but are not limited to, alumoxane (e.g., "MAO"), modified alumoxane (e.g., "TIBAO"), and alkylaluminum compounds. Ionizing activators (neutral or ionic) such as tri (n-butyl)ammonium tetrakis (pentafluorophenyl)boron can be also be used. Further, a trisperfluorophenyl boron metalloid precursor can be used. Any of those activators/precursors can be used alone or in combination with the others.

MAO and other aluminum-based activators are known in the art. Ionizing activators are known in the art and are described by, for example, Eugene You-Xian Chen & Tobin J. Marks, Cocatalysts for Metal-Catalyzed Olefin Polymerization: Activators, Activation Processes, and Structure-Activity Relationships 100(4) Chemical Reviews 1391-1434 (2000). The activators can be associated with or bound to a support, either in association with the catalyst component (e.g., metallocene) or separate from the catalyst component, such as described by Gregory G. Hlatky, Heterogeneous Single-Site Catalysts for Olefin Polymerization 100(4) Chemical Reviews 1347-1374 (2000).

Ziegler-Natta Catalyst

Illustrative Ziegler-Natta catalyst compounds are disclosed in Ziegler Catalysts 363-386 (G. Fink, R. Mulhaupt and H. H. Brintzinger, eds., Springer-Verlag 1995); or in EP 0 103 120; EP 0 102 503; EP 0 231 102; EP 0 703 246; RE 33,683; U.S. Pat. Nos. 4,302,565; 5,518,973; 5,525,678; 5,288,933; 5,290,745; 5,093,415 and 6,562,905. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts are those traditional Ziegler-Natta catalysts that are well known in the art. Examples of conventional-type transition metal catalysts are discussed in U.S. Pat. Nos. 4,115,639, 4,077,904, 4,482,687, 4,564,605, 4,721,763, 4,879,359 and 4,960,741. The conventional-type transition metal catalyst compounds that can be used include transition metal compounds from Groups 3 to 17, or Groups 4 to 12, or Groups 4 to 6 of the Periodic Table of Elements.

These conventional-type transition metal catalysts can be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. Examples of conventional-type transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_{3.1}/3AlCl_3$ and $Ti(OC_{12}H_{25})Cl_3$.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated, which are well known to those of ordinary skill in the art. One example of the general method of preparation of such a catalyst includes the following: dissolve $TiCl_4$ in THF, reduce the compound to $TiCl_3$ using Mg, add $MgCl_2$, and remove the solvent.

Conventional-type co-catalyst compounds for the above conventional-type transition metal catalyst compounds can be represented by the formula $M_3M_{4v}X_{2c}R_{3b-c}$, where $M_3$ is a metal from Group 1 to 3 or 12 to 13 of the Periodic Table of Elements; $M_4$ is a metal of Group 1 of the Periodic Table of Elements; v is a number from 0 to 1; each $X_2$ is any halogen; c is a number from 0 to 3; each $R_3$ is a monovalent hydrocarbon radical or hydrogen; b is a number from 1 to 4; and where b minus c is at least 1. Other conventional-type organometallic cocatalyst compounds for the above conventional-type transition metal catalysts have the formula $M_3R_3k$, where $M_3$ is a Group IA, IIA, IIB or IIIA metal, such as lithium, sodium, beryllium, barium, boron, aluminum, zinc, cadmium, or gallium; k equals 1, 2 or 3 depending upon the valency of $M_3$, which valency in turn normally depends upon the particular Group to which $M_3$ belongs; and each $R_3$ can be any monovalent radical, including hydrocarbon radicals and hydrocarbon radicals containing a Group 13 to 16 element like fluoride, aluminum or oxygen or a combination thereof.

Mixed Catalyst System

The mixed catalyst can be a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one preferred embodiment, the mixed catalyst includes at least one metallocene catalyst component and at least one non-metallocene component.

Only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for monitoring a polymerization reaction, comprising:
   estimating an acoustic condition of a polymer produced in a reactor;
   estimating a stickiness control parameter of the polymer produced in the reactor; and
   pairing the acoustic condition with the stickiness control parameter to provide a paired acoustic condition and stickiness control parameter.

2. The method of claim 1, wherein the acoustic condition of the polymer is determined in real-time during the polymerization reaction and wherein the stickiness control parameter of the polymer is determined at a later point in time than the acoustic condition.

3. The method of claim 1, wherein both the acoustic condition and the stickiness control parameter are determined in real-time.

4. The method of claim 1, wherein the reactor is a fluidized bed reactor.

5. The method of claim 1, wherein the polymer is produced by a polymerization reaction of ethylene and at least one comonomer in the presence of a catalyst selected from the group consisting of Ziegler-Natta, chromium, chromium oxide, $AlCl_3$, cobalt, iron, palladium, and metallocene catalysts, and wherein the at least one comonomer comprises a $C_3$-$C_{10}$ alpha olefin.

6. The method of claim 1, wherein the stickiness control parameter is equal to a current reactor temperature minus a reduced melt reference temperature.

7. The method of claim 6, wherein the reduced melt reference temperature is a reduced melt initiation temperature.

8. The method of claim 7, wherein the reduced melt initiation temperature is estimated using a melt initiation depression model that implements the Flory equation.

9. The method of claim 7, further comprising controlling the reactor to maintain the stickiness control parameter below about 8° C.

10. The method of claim 9, wherein controlling the reactor comprises adjusting at least one of a concentration of one or more reaction medium constituents, a temperature within the reactor, and a pressure within the reactor.

11. The method of claim 1, further comprising estimating an acoustic condition and a stickiness control parameter for a plurality of different polymers to produce a plurality of paired acoustic conditions and stickiness control parameters; determining a relationship between the plurality of paired acoustic conditions and stickiness control parameters; and storing the relationship to produce a predetermined relationship.

12. The method of claim 1, wherein estimating the acoustic condition comprises measuring a plurality of acoustic signals over a period of time ranging from about 0.001 seconds to about 1,000 seconds.

13. The method of claim 1, wherein estimating the acoustic condition comprises measuring one or more acoustic signals and wherein the one or more acoustic signals are narrow band filtered around a center frequency of 190 kHz using a 100-350 kHz band pass filter.

14. The method of claim 1, wherein estimating the acoustic condition comprises measuring one or more acoustic signals and wherein the one or more acoustic signals are amplified to produce a signal in the range of from about 1 to about 10 volts.

15. The method of claim 11, further comprising estimating a current acoustic condition for a polymer being produced in the reactor; and identifying an expected current stickiness control parameter of the polymer from the current acoustic condition and the relationship between the plurality of paired acoustic conditions and stickiness control parameters.

16. The method of claim 15, further comprising controlling at least one operating condition of the reactor in response to at least one of the current acoustic condition and the expected current stickiness control parameter.

17. The method of claim 15, further comprising estimating a current stickiness control parameter for a polymer being produced in the reactor; and identifying an expected current acoustic condition of the polymer from the current stickiness control parameter and the relationship between the plurality of paired acoustic conditions and stickiness control parameters.

18. The method of claim 15, wherein the plurality of acoustic conditions and the plurality of stickiness control parameters are estimated in real time.

19. The method of claim 11, further comprising
identifying an expected current stickiness control parameter of the polymer from the estimated acoustic condition and a predetermined relationship, wherein the predetermined relationship is produced from a plurality of previously determined acoustic conditions paired with a plurality corresponding and previously determined stickiness control parameters.

20. The method of claim 19, further comprising estimating a current stickiness control parameter; and comparing the expected current stickiness control parameter and the estimated current stickiness control parameter.

21. The method of claim 20, further comprising initiating an alarm to alert one or more operators of possible polymer stickiness within the polymerization reactor if the current stickiness control parameter falls outside a predetermined range for the expected stickiness control parameter.

22. The method of claim 20, further comprising adjusting at least one operating condition of the polymerization reactor if the current stickiness control parameter falls outside a predetermined range for the expected stickiness control parameter.

23. The method of claim 11, wherein the stickiness control parameters are equal to a reactor temperature for each of the plurality of polymers at the time when the acoustic conditions are estimated minus a reduced melt reference temperature for each of the plurality of polymers.

* * * * *